United States Patent
Suzuki et al.

(10) Patent No.: US 7,446,881 B2
(45) Date of Patent: Nov. 4, 2008

(54) SYSTEM, APPARATUS, AND METHOD FOR DETERMINING TEMPERATURE/THICKNESS OF AN OBJECT USING LIGHT INTERFERENCE MEASUREMENTS

(75) Inventors: Tomohiro Suzuki, Yamanashi (JP); Chishio Koshimizu, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 309 days.

(21) Appl. No.: 11/325,504

(22) Filed: Jan. 5, 2006

(65) Prior Publication Data
US 2006/0152734 A1 Jul. 13, 2006

Related U.S. Application Data

(60) Provisional application No. 60/648,691, filed on Feb. 2, 2005.

(30) Foreign Application Priority Data
Jan. 12, 2005 (JP) .............................. 2005-005309

(51) Int. Cl.
*G01B 11/02* (2006.01)
*G01B 9/02* (2006.01)
(52) U.S. Cl. ..................... 356/497; 356/479; 356/503
(58) Field of Classification Search ................. 356/479, 356/497, 503, 504
See application file for complete search history.

(56) References Cited

U.S. PATENT DOCUMENTS 5,633,712 A * 5/1997 Venkatesh et al. ........... 356/503

| | | | |
|---|---|---|---|
| 6,014,214 A * | 1/2000 | Li | 356/511 |
| 6,738,144 B1 * | 5/2004 | Dogariu | 356/479 |
| 6,806,963 B1 * | 10/2004 | Walti et al. | 356/497 |
| 2005/0140981 A1 * | 6/2005 | Waelti | 356/479 |
| 2006/0103850 A1 * | 5/2006 | Alphonse et al. | 356/479 |

FOREIGN PATENT DOCUMENTS

WO WO 03/087744 A1 10/2003

OTHER PUBLICATIONS

J.A. McCaulley, V.M. Donelly et al. (J.A. McCaulley, V.M. Donelly, M. Vernon and I. Taha), "Temperature dependence of the near-infrared refractive index of silicon, gallium arsenide and indium phosphide", The American Physical Society, Phy. Rev. B49,7408, 1994.

* cited by examiner

*Primary Examiner*—Samuel A Turner
(74) *Attorney, Agent, or Firm*—Oblon, Spivak, McClelland, Maier & Neustadt, P.C.

(57) ABSTRACT

A measuring apparatus including a light source that emits light with a wavelength that allows the light to be transmitted through and reflected at each measurement target, a splitter that splits the light from the light source into measurement light and reference light, a reference mirror at which the reference light from the splitter is reflected, a mechanism for driving the reference mirror to adjust the optical path length of the reference light reflected from the reference mirror and a mechanism for measuring the interference of the reference light reflected from the reference mirror as the reference light from the splitter is radiated toward the reference mirror and measurement beams reflected from a plurality of measurement targets as the measurement light from the splitter is radiated toward the measurement targets so as to be transmitted through the measurement targets.

36 Claims, 18 Drawing Sheets

FIG.8

|  | OUTBOUND PATH | INBOUND PATH |
|---|---|---|
| OPTICAL PATH A | $U_1$ | $U_1$ |
| OPTICAL PATH B | $U_1$ | $U_2$ |
| OPTICAL PATH C | $U_2$ | $U_1$ |
| OPTICAL PATH D | $U_2$ | $U_2$ |

SYSTEM, APPARATUS, AND METHOD FOR DETERMINING TEMPERATURE/THICKNESS OF AN OBJECT USING LIGHT INTERFERENCE MEASUREMENTS

CROSS REFERENCE TO RELATED APPLICATIONS

This document claims priority to Japanese patent application No. 2005-005309, filed Jan. 12, 2005 and U.S. Provisional Application No. 60/648, 691, filed Feb. 02, 2005, the entire contents of which are hereby incorporated by reference.

FIELD OF THE INVENTION

The present invention relates to a temperature/thickness measuring apparatus, a temperature/thickness measuring method, a temperature/thickness measuring system, a control system and a control method with which the temperature or thickness at the front surface, the rear surface, an inner layer or the like of a measurement target such as a semiconductor wafer or a liquid crystal substrate can be measured accurately.

BACKGROUND OF THE INVENTION

It is crucial that the temperature or the like of a substrate processed by, for instance, a substrate processing apparatus, such as a semiconductor wafer (hereafter may be simply referred to as a "wafer") be measured with a high degree of accuracy in order to accurately control the shapes, the physical characteristics and the like of films, holes and the like formed on the wafer by executing various types of processing such as film formation and etching. Accordingly, various wafer temperature measuring methods have been proposed in the related art, including the use of a resistance thermometer and the use of a fluorescence thermometer that measures the temperature at the rear surface of the base material.

In recent years, research into temperature measuring methods and temperature measuring apparatuses that enable direct measurement of the wafer temperature, which is difficult with the temperature measuring methods in the related art, has gained significant ground (see, for instance, International Publication No. 03/087744). A specific example of a temperature measuring apparatus is now explained in reference to FIGS. 19 and 20. FIG. 19 illustrates the principle of a temperature measuring apparatus in the related art, whereas FIG. 20 is a conceptual diagram of interference waveforms measured with the temperature measuring apparatus.

The temperature measuring apparatus 10 in FIG. 19 is constituted with a low coherence interferometer that may be achieved by adopting the basic principle of, for instance, a Michelson interferometer. The temperature measuring apparatus 10 includes a light source 12 constituted with, for instance, an SLD (super luminescent diode) having low coherence characteristics, a beam splitter 14 that splits the light originating from the light source 12 into two beams, i.e., reference light to be radiated onto a reference mirror 20 and measurement light to be radiated onto a measurement target 30, the reference mirror 20 drivable along a single direction, with which the optical path length of the reference light can be varied, and a light receiver 16 that receives the reference light reflected at the reference mirror 20 and the measurement light reflected at the measurement target 30 and measures the extent of interference.

In this temperature measuring apparatus 10, the light originating from the light source 12 is split at the beam splitter 14 into two beams, i.e., the reference light and the measurement light. The measurement light is radiated toward the measurement target and is reflected at various layers, whereas the reference light is radiated toward the reference mirror 20 and is reflected at the mirror surface. Then, both the reflected reference light and the reflected measurement light reenter the beam splitter 14, and depending upon the optical path length of the reference light, the reflected light beams become superimposed upon each other, thereby inducing interference. The resulting interference wave is detected by the light receiver 16.

Accordingly, the reference mirror 20 is driven along the single direction to alter the optical path length of the radiated light for the temperature measurement. Since the coherence length of the light from the light source 12 is small due to the low coherence characteristics of the light source 12, intense interference manifests at a position at which the optical path length of the measurement light and the optical path length of the reference light match and the extent of interference is substantially reduced at other positions under normal circumstances. As the reference mirror 20 is driven along, for instance, the forward/backward direction (the direction indicated by the arrows in FIG. 19) and the optical path length of the reference light is adjusted as described above, the reflected measurement beams from the individual layers (A layer and B layer) at the measurement target with different refractive indices ($n_1$, $n_2$), and the reflected reference light interfere with each other and, as a result, interference waveforms such as those shown in FIG. 20 are detected. Thus, the measurement of the temperature at the measurement target along the depthwise direction is enabled.

As the temperature of the measurement target being heated with a heater or the like changes as shown in FIG. 20, the measurement target expands. At this time, the refractive indices at the various layers at the measurement target 30, too, become altered and, as a result, the interference waveform positions following the temperature change shift relative to the positions prior to the temperature change, which changes the intervals between the individual peak positions. The extent by which the peak positions of the interference waveforms change corresponds to the extent of the temperature change. In addition, the distances between the peak positions of the interference waveforms correspond to the distance by which the reference mirror 20 moves. Thus, by accurately measuring the intervals between the peak positions in the interference waveforms based upon the distance by which the reference mirror 20 is displaced, the change in the temperature can be measured.

The temperature of an electrode plate at an upper electrode disposed inside a processing chamber of a substrate processing apparatus, as well as the wafer temperature, can be measured by using the temperature measuring apparatus described above. It will be particularly convenient if the wafer temperature and the temperature of the electrode plate or the like can be measured at once. Namely, by measuring the temperatures of a plurality of temperature measurement targets through a single temperature measurement operation, the labor and the time required for the temperature measurement can be greatly reduced at minimum cost.

However, the following problems may occur if the temperatures of a plurality of measurement targets disposed so as to face opposite each other, such as the wafer and the electrode plate of the upper electrode, are to be measured. For instance, the measurement light originating from the light source may be transmitted via optical fibers by, for instance, installing the optical fiber to be used for the wafer temperature measurement through the bottom part of the processing chamber and installing the optical fiber to be used for the measurement of the temperature at the electrode plate of the upper electrode through the upper portion of the processing chamber. Since this requires the optical fibers to be laid out from the top and the bottom of the processing chamber to transmit the measurement light beams originating from a single light source, the optical fiber layout becomes very complicated, which is bound to complicate the installation process for the temperature measuring apparatus.

As an alternative, both the optical fiber to be used for the wafer temperature measurement and the optical fiber to be used for the measurement of the temperature at the electrode plate of the upper electrode may be disposed through the upper portion of the processing chamber. However, since the wafer is placed below the electrode plate of the upper electrode at a distance from the electrode plate, an insertion hole through which the optical fiber for radiating the measurement light onto the wafer, i.e., one of the measurement targets, is to be inserted, needs to be formed at the other measurement target, i.e., the electrode plate of the upper electrode, in order to enable radiation of the measurement light onto the wafer. This means that it becomes necessary to specially form the hole at the measurement target through an additional process.

SUMMARY OF THE INVENTION

An object of the present invention is to provide a temperature/thickness measuring apparatus and the like, with which the temperatures or the thicknesses of a plurality of measurement targets set so as to face opposite each other can be measured at once without having to form a hole at a measurement target, through which measurement light to be used to measure the temperature/thickness of another measurement target is to pass, while reducing the labor required when installing the temperature/thickness measuring apparatus.

The object described above is achieved in an aspect of the present invention by providing a temperature/thickness measuring apparatus that measures temperatures or the thicknesses of a plurality of measurement targets set so as to face opposite each other based upon interference of light, comprising a light source that emits light with a wavelength that allows the light to be transmitted and reflected at the individual measurement targets, a splitter that splits the light from the light source to measurement light and reference light, a reference light reflecting means for reflecting the reference light from the splitter, an optical path length altering means for altering the optical path length of the reference light reflected by the reference light reflecting means a reference light transmitting means for transmitting the reference light from the splitter to a reference light radiation position at which the reference light is radiated toward the reference light reflecting means, a measurement light transmitting means for transmitting the measurement light from the splitter to a measurement light radiation position at which the measurement light is radiated toward the plurality of measurement targets so as to be transmitted through the measurement targets and a light receiving means for measuring interference of light manifested by measurement beams reflected from the individual measurement targets and the reference light reflected from the reference light reflecting means.

The object described above is also acheieved in another aspect of he present invention by providing a temperature/thickness measuring method of measuring the temperature or the thicknesses of a plurality of measurement targets set so as to face opposite of each other based upon interference of light, comprising a step in which measurement light and reference light obtained by splitting light from a light source that emits light with wavelenght allowing the light to be trasmitted and reflected at the individual measurement targets are radiated respectively towards the plurality of measurement targets so asto be transmitted through the measurement targets and towards a reference light reflecting means, a step in which interference of light manifested by measurement beams reflected from the individual measurement targets and the reference light reflected from the reference light reflecting means is measured while altering the optical path length of the reference light reflected from the reference light reflecting means by scanning the reference light reflecting means along one direction and a step in which the temperatures of the thicknesses of the measurement targets are measured based upon the results of the interference measurement.

In the apparatus or the method according to the present invention described above, as the measurement light obtained by splitting the light from the light source is radiated toward the plurality of measurement targets set so as to face opposite each other, the measurement light is reflected at the front surface, the rear surface or the like of a first measurement target disposed at an end position and is also transmitted through the first measurement target. Thus, the transmitted light can be used as a measurement beam in a temperature/thickness measurement at the measurement target disposed at a second position. The measurement light is transmitted through the subsequent measurement targets in a similar manner and thus, the beam of the measurement light having been transmitted through a preceding measurement target can be used as the measurement beam in the temperature/thickness measurement for the third measurement target or a subsequent measurement target, as the measurement beam is reflected at the front surface, the rear surface and the like at the measurement target. Accordingly, by measuring the extent of interference of light manifested by the individual measurement beams reflected from the measurement targets and the reference light reflected from the reference light reflecting means, the temperatures or the thicknesses of the various measurement targets can be ascertained at once.

By using the measurement light having been transmitted through a given measurement target as the measurement beam in the measurement at the measurement target set at the next position as described above, the plurality of measurement beams reflected from the individual measurement targets can be received in a simple structure in which the measurement light obtained by splitting the light from the light source is radiated toward the plurality of measurement targets. This facilitates the layout of the means for measurement light transmission such as optical fibers and reduces the labor required when installing the temperature measuring apparatus since no special hole needs to be formed at any measurement target. In addition, since the temperatures at the plurality of measurement targets can be measured at once with a single temperature measuring apparatus, the length of time required for the temperature measurement can be minimized while keeping down the manufacturing costs to the lowest possible level.

In the apparatus or the method described above, a detour optical path may be formed in the middle of the optical path of the measurement light. Such a detour optical path may be connected in parallel to the measurement light optical path so as to enable measurement of interference of light manifested by measurement light transmitted directly without traveling through the detour optical path and the reference light and measurement of interference manifested by measurement light that travels through the measurement light detour optical path at least once during the process of being transmitted and the reference light. The extent of offset occurring with respect to the different instances of interference can be adjusted by adjusting the length of the measurement light detour optical path.

Accordingly, by adjusting the length of the measurement light detour optical path, it can be ensured, for instance, that the waveforms of the interference of the measurement beams from the individual measurement targets and the reference light can be measured near one another. This means that the reference light reflecting means (e.g., a reference mirror) only needs to travel over the range in which the interference waveforms attributable to the measurement beams and the reference light corresponding to the various measurement targets, at least, can all be measured. Since it allows the distance over which the reference light reflecting means (e.g., a reference mirror) needs to move to be reduced, the length of time required for the temperature/thickness measurement, too, can be reduced. By adjusting the length of the measurement light detour optical path so that the peak widths of the interference waveforms corresponding to the individual measurement targets entirely or partially overlap when they are measured, the distance over which the reference light reflecting means (e.g., a reference mirror) needs to move can be further reduced, which is bound to further reduce the length of time required for the temperature/thickness measurement.

A measurement light splitter that splits the measurement light from the splitter into a plurality of measurement beams may be provided in the apparatus or in conjunction with the method described above, and by radiating the individual measurement beams from the measurement light splitter toward the plurality of measurement targets so that they are transmitted through the measurement targets, the interference of the measurement beams having exited the measurement light splitter and reflected at the measurement targets with the reference light reflected from the reference light reflecting means can be measured. Since this allows the optical axes of the measurement beams to be adjusted in correspondence to the individual measurement targets, the optical axes of the measurement beams can be adjusted with ease irrespective of the level of the parallelism among the measurement targets.

The reference light reflecting means in the apparatus or the method described above may include a plurality of reflecting surfaces at which the reference light having traveled from the splitter is reflected as a plurality of reference beams with varying optical path lengths. In this case, the interference of the plurality of reference beams reflected from the various reflecting surfaces and the measurement beams reflected from the individual measurement targets can be measured. While offset occurs among instances of the interference, the extent of offset can be adjusted through adjustment of the positions of the plurality of reflecting surfaces at the reference light reflecting means.

Accordingly, the positions of the plurality of reflecting surfaces at the reference light reflecting means can be adjusted so as to measure the interference waveforms attributable to different sets of measurement beams and reference beams, each corresponding to one of the measurement targets, at positions close to one another or to measure the interference waveforms with the entirety or part of the peak widths of the interference waveforms corresponding to the individual measurement targets overlapping with one another. This means that the reference light reflecting means (e.g., a reference mirror) only needs to travel over the range in which the interference waveforms attributable to the measurement beams and the reference beams corresponding to the various measurement targets, at least, can all be measured. Since it allows the distance over which the reference light reflecting means (e.g., a reference mirror) moves to be reduced, the length of time required for the temperature/thickness measurement, too, can be reduced.

In addition, a reference light splitter that splits the reference light from the splitter into a plurality of reference beams may be provided in the apparatus or in conjunction with the method described above. By radiating the plurality of reference beams from the reference light splitter onto the reference light reflecting means, it becomes possible to measure the interference of the individual reference beams having departed the reference light splitter and reflected at the reference light reflecting means and the measurement beams reflected from the individual measurement targets. While there is an offset among the instances of interference, the extent of the offset can be adjusted through adjustment of the optical path lengths of the plurality of reference beams from the reference light splitter.

Accordingly, the optical path lengths of the plurality of reference beams from the reference light splitter can be adjusted so as to measure the interference waveforms attributable to different sets of measurement beams and reference beams, each corresponding to one of the measurement targets, at positions close to one another or to measure the interference waveforms with the entirety or part of the peak widths of the interference waveforms corresponding to the individual measurement targets overlapping with one another. This means that the reference light reflecting means (e.g., a reference mirror) only needs to travel over the range in which the interference waveforms attributable to the measurement beams and the reference beams corresponding to the various measurement targets, at least, can all be measured. Since it allows the distance over which the reference light reflecting means (e.g., a reference mirror) moves to be reduced, the length of time required for the temperature/thickness measurement, too, can be reduced.

In the apparatus or the method described above, a detour optical path may be formed in the middle of the optical path of the reference light. The reference light detour optical path may be connected in parallel to the reference light optical path so as to enable measurement of interference of light manifested by measurement light transmitted directly without traveling through the reference light detour optical path and the measurement light and measurement of interference manifested by reference light that travels through the reference light detour optical path at least once during the process of being transmitted and the measurement light. The extent of offset occurring with respect to the different instances of interference can be adjusted by adjusting the length of the reference light detour optical path.

Accordingly, by adjusting the length of the reference light detour optical path, it can be ensured, for instance, that the waveform of the interference of the measurement light and the reference light corresponding to the individual measurement targets can be measured near one another. This means that the reference light reflecting means (e.g., a reference mirror) only needs to travel over the range in which the interference waveforms attributable to the measurement beams and the reference light corresponding to the various measurement targets, at least, can all be measured. Since it allows the distance over which the reference light reflecting means (e.g., a reference mirror) moves to be reduced, the length of time required for the temperature/thickness measurement, too, can be reduced. By adjusting the length of the reference light detour optical path so that the peak widths of the interference waveforms corresponding to the individual measurement targets entirely or partially overlap when they are measured, the distance over which the reference light reflecting means (e.g., a reference mirror) needs to move can be further reduced, which is bound to further reduce the length of time required for the temperature/thickness measurement.

In addition, the various light beams (including the light originating from the light source, the measurement light, the reference light, etc.) used in the apparatus or the method described above may each be transmitted through the air In this case, light can be transmitted without using an optical fiber or a collimate fiber and, as a result, a light source that emits light with a wavelength (e.g., equal to or greater than 2.5 μm) that does not allow the light to pass through optical fibers or collimate fibers can be utilized.

In addition, the measurement targets undergoing the measurement in the apparatus or through the method described above should be constituted of, for instance, silicon or a silicon oxide film and the light source should be capable of emitting light with a wavelength within a range of, for instance, 1.0 to 2.5 μm. Since light with a wavelength of 1.0 to 2.5 μm is transmitted through and reflected at silicon or a silicon oxide film, the measurement beam having been transmitted through a given measurement target can then be utilized as a measurement beam in the measurement for the measurement target disposed at the next position.

The measurement targets undergoing the measurement in the apparatus or through the method described above may be, for instance, a substrate (e.g., a semiconductor wafer or a glass substrate) processed in a substrate processing apparatus (such as a plasma processing apparatus) or a circumferential ring (such as a focus ring) disposed around the substrate and an electrode plate (e.g., the electrode plate of an upper electrode or the electrode plate of a lower electrode) disposed so as to face opposite the substrate. Thus, according to the present invention adopting a simple structure described above, the temperatures or the thicknesses of the electrode plate and the substrate or the circumferential ring facing opposite each other in the substrate processing apparatus can be measured at once and, as a result, the labor and the length of time required for the temperature measurement can be minimized while keeping down the cost to a minimum level.

In the method described above, the intensity of the light from the light source may be adjusted while measuring the interference of the measurement light and the reference light. For instance, the light intensity at the light source may be gradually increased in correspondence to the distance traveled by the reference light reflecting means or the intensity of the light from the light source may be altered in correspondence to each measurement target. The intensity of the light emitted from the light source may be altered in correspondence to the individual measurement targets by, for instance, adjusting the light intensity at the light source in correspondence to the levels of the intensity of the measurement beams reflected at the individual measurement targets or by raising the intensity of the light from the light source for the measurement target located over a greater distance from the measurement light radiation position. The adjustment of the intensity of the light from the light source ensures that the intensity level of the measurement light transmitted through the individual measurement targets and the space between the measurement targets is sustained at a desired level and ultimately ensures that the interference waveform attributable to each set of measurement beams and reference beams remains intact by preventing any decrease of the light intensity (S/N ratio) relative to the noise in the interference waveform. As a result, the accuracy with which the peak positions in the interference waveform are detected is improved and thus, the accuracy with which the temperature or the thickness of each measurement target is measured based upon the width of the interval between the peaks in the interference waveforms is also improved.

The object described above is also achieved in yet another aspect of the present invention by providing a temperature/thickness measuring system comprising a substrate processing apparatus that executes a specific type of processing on a substrate placed so as to face opposite an electrode plate within a processing chamber thereof by applying high-frequency power to the electrode plate, a temperature/thickness measuring apparatus mounted at the substrate processing apparatus and a control device that controls the temperature/thickness measuring apparatus. The temperature/thickness measuring apparatus in this temperature/thickness measuring system includes a light source that emits light with a wavelength that allows the light to be transmitted through and reflected at a plurality of measurement targets, including at least, the electrode plate and the substrate or a circumferential ring disposed around the substrate, a splitter that splits the light from the light source to measurement light and reference light, a reference light reflecting means for reflecting the reference light from the splitter, an optical path length altering means for altering the optical path length of the reference light reflected by the reference light reflecting means a reference light transmitting means for transmitting the reference light from the splitter to a reference light radiation position at which the reference light is radiated toward the reference light reflecting means, a measurement light transmitting means for transmitting the measurement light from the splitter to a measurement light radiation position at which the measurement light is radiated toward the plurality of measurement targets, so as to be transmitted through the measurement targets and a light receiving means for measuring interference of light manifesting between measurement beams reflected from the individual measurement targets and the reference light reflected from the reference light reflecting means. The control device in the temperature/thickness measuring system determines the temperatures or the thicknesses of the measurement targets based upon the results of the interference measurement provided by the light receiving means.

The temperature/thickness measuring system according to the present invention described above facilitates the layout of the means for measurement light transmission such as optical fibers and reduces the labor required when installing the temperature measuring apparatus at the substrate processing apparatus since no special hole needs to be formed at any measurement target. In addition, since the temperatures at the plurality of measurement targets including the substrate and the electrode plate set opposite each other in the substrate processing apparatus can be measured at once with a single temperature measuring apparatus, the length of time required for the temperature measurement can be minimized while keeping down the costs to the lowest possible level.

The object described above is also achieved in yet another aspect of the present invention by providing a control system comprising a substrate processing apparatus that executes a specific type of processing on a substrate placed so as to face opposite an electrode plate within a processing chamber thereof by applying high-frequency power to the electrode plate, a temperature/thickness measuring apparatus mounted at the substrate processing apparatus and a control device that controls the temperature/thickness measuring apparatus. The temperature/thickness measuring apparatus in this control system includes a light source that emits light with a wavelength that allows the light to be transmitted through and reflected at a plurality of measurement targets, including at least, the electrode plate and the substrate or a circumferential ring disposed around the substrate, a splitter that splits the light from the light source to measurement light and reference light, a reference light reflecting means for reflecting the reference light from the splitter, an optical path length altering means for altering the optical path length of the reference light reflected by the reference light reflecting means, a reference light transmitting means for transmitting the reference light from the splitter to a reference light radiation position at which the reference light is radiated toward the reference light reflecting means, a measurement light transmitting means for transmitting the measurement light from the splitter to measurement light radiation position at which the measurement beam is radiated toward the plurality of measurement targets so as to be transmitted through the measurement targets and a light receiving means for measuring interference of light manifesting between measurement beams reflected from the individual measurement targets and the reference light reflected from the reference light reflecting means. The control device in the control system determines the temperatures or the thicknesses of the measurement targets based upon the results of the interference measurement provided by the light receiving means and executes at least either temperature control or process control for the substrate present in the processing chamber of the substrate processing apparatus.

The control system according to the present invention described above allows the temperatures or the thicknesses of the plurality of measurement targets including the substrate and the electrode plate set so as to face opposite each other in the substrate processing apparatus, for instance, to be measured at once, and thus enables temperature control or process control for the substrate based upon the temperatures or the thicknesses thus measured. As a result, the process characteristics of the substrate can be controlled accurately and the stability of the substrate processing apparatus is improved.

The object described above is achieved in yet another aspect of the present invention by providing a control method to be adopted in a control system for a substrate processing apparatus that executes a specific type of processing on a substrate set so as to face opposite an electrode plate within a processing chamber thereof by applying high-frequency power to the electrode plate. The method comprises a step in which measurement light and reference light obtained by splitting light from a light source that emits light with a wavelength allowing the light to be transmitted and reflected at a plurality of measurement targets including at least the electrode plate and the substrate or a circumferential ring disposed around the substrate are radiated respectively toward the plurality of measurement targets so as to be transmitted through the measurement targets and toward a reference light reflecting means, a step in which interference of light manifested by measurement beams reflected from the individual measurement targets and the reference light reflected from the reference light reflecting means is measured while altering the optical path length of the reference light reflected from the reference light reflecting means by scanning the reference light reflecting means along one direction, a step in which the temperatures or the thicknesses of the measurement targets are measured based upon the results of the interference measurement and a step in which at least either temperature control or process control is executed for the substrate in the substrate processing apparatus based upon the temperatures or the thicknesses of the measurement targets having been measured.

The control method according to the present invention described above allows the temperatures or the thicknesses of the plurality of measurement targets including the substrate and the electrode plate set so as to face opposite each other in the substrate processing apparatus, for instance, to be measured at once, and thus enables temperature control or process control for the substrate based upon the temperatures or the thicknesses thus measured. As a result, the process characteristics of the substrate can be controlled accurately and the stability of the substrate processing apparatus is improved.

BRIEF DESCRIPTION OF THE DRAWINGS

FIG. 8 shows different types of measurement light optical paths achieved by the temperature measuring apparatus in the embodiment;

DETAILED DESCRIPTION OF THE PREFERRED EMBODIMENTS

Figure 1:
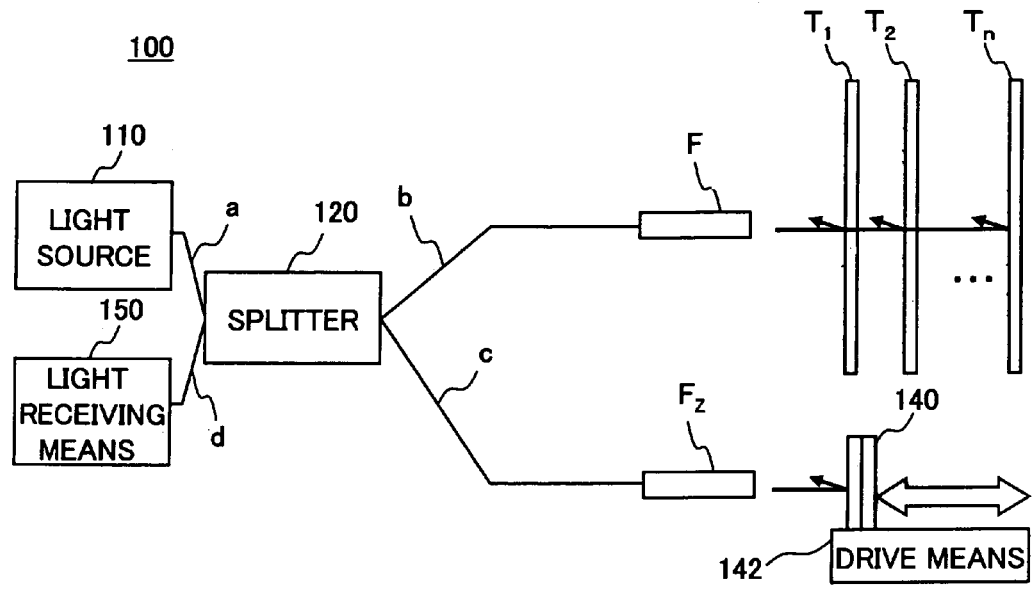
FIG. 1 is a block diagram schematically illustrating the structure adopted in the temperature measuring apparatus achieved in a first embodiment of the present invention.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

(Temperature Measuring Apparatus Achieved in the First Embodiment)

Figure 19:
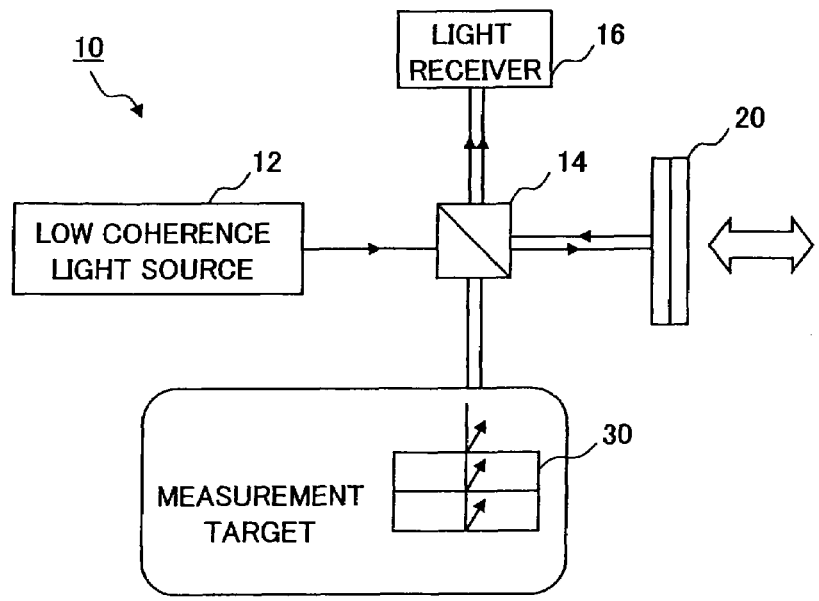
FIG. 19 illustrates the principle of a temperature measuring apparatus in the related art.
Figure 20:
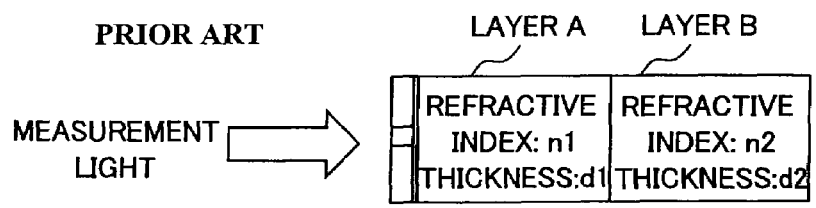
FIG. 20 conceptually illustrates interference waveforms measured with the temperature measuring apparatus shown in FIG. 19.
Figure 20:
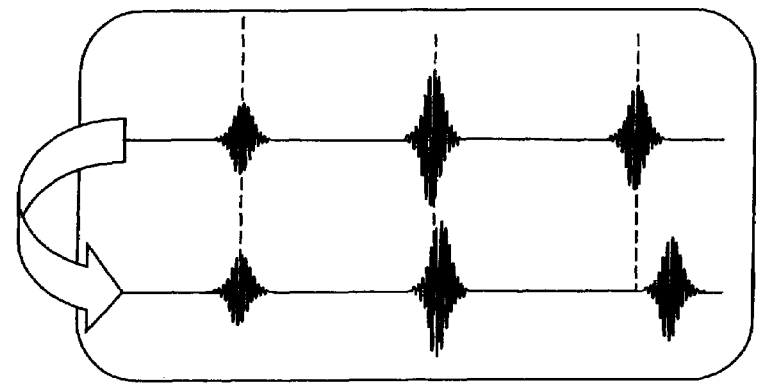

The temperature measuring apparatus achieved in the first embodiment of the present invention is now explained in reference to drawings. FIG. 1 is a block diagram schematically illustrating the structure adopted in the temperature measuring apparatus achieved in the first embodiment of the present invention. With the temperature measuring apparatus 100 achieved in the first embodiment, the temperatures at a plurality of measurement targets $T_1$ through $T_n$ set so as to face opposite one another, as shown in FIG. 1, can be measured all at once simply by scanning a reference light reflecting means such as a reference mirror just once based upon the principle explained earlier in reference to FIG. 19. The specific structure assumed in this temperature measuring apparatus 100 is described below.

As shown in FIG. 1, the temperature measuring apparatus 100 comprises a light source 110, a splitter 120 at which light originating from the light source 110 is split into measurement light and reference light, a reference light reflecting means 140 for reflecting the reference light from the splitter 120 and an optical path length altering means for altering the optical path length of the reference light reflected from the reference light reflecting means 140. The optical path length altering means is constituted with a drive means 142 such as a motor that drives the reference light reflecting means 140, which may be constituted with, for instance, a reference mirror, along a single direction parallel to the direction in which the reference light enters. By driving the reference mirror along a single direction in this manner, the optical path length of the reference light reflected from the reference mirror can be altered.

The temperature measuring apparatus 100 also includes a light receiving means for measuring the interference of first through nth measurement beams respectively reflected from the plurality of measurement targets $T_1$ through $T_n$ facing opposite one another as the measurement targets $T_1$ through $T_n$ are irradiated with the measurement light from the splitter 120 and reference light reflected from the reference light reflecting means 140 irradiated with the reference light from the splitter 120.

The light source 110 in such a temperature measuring apparatus 100 should be capable of emitting light that is transmitted through and reflected at the individual measurement targets $T_1$ through $T_n$ and enables measurement of the interference of the measurement light and the reference light obtained by splitting the light from the light source 110, since temperatures are measured based upon the interference of the measurement light from the light source 110 transmitted through and reflected at the measurement targets $T_1$ through $T_n$ and the reference light. More specifically, the measurement light from the light source 110 is used in the measurement at the measurement target $T_1$ located at a first (outermost end) position, and the measurement light having been transmitted through the preceding measurement target is used as measurement light in the measurement for a second or subsequent measurement target $T_2$ through $T_n$. Beams of the measurement light reflected from the individual measurement targets $T_1$ through $T_n$ are received by the light receiving means. This structure allows the temperatures at all the measurement targets $T_1$ through $T_n$ to be measured at once without having to form holes at the measurement targets for allowing the measurement light to be used in the measurement at the subsequent measurement targets to pass through.

If the measurement target is a wafer, for instance, the light from the light source 110 should be such that no interference is induced at least with reflected light beams from points set apart by the distance between the front surface and the rear surface of the wafer (approximately 800 to 1500 μm under normal circumstances). More specifically, it is desirable to use, for instance, low coherence light. The term "low coherence light" refers to light with a small coherence length. It is desirable that the central wavelength of the low coherence light be 0.3 to 20 μm and it is even more desirable that the central wavelength be 0.5 to 5 μm. In addition, it is desirable that the coherence length be, for instance, 0.1 to 100 μm and it is even more desirable to use light with a coherence length equal to or less than 3 μm. By using the light source 110 that emits such low coherence light, any problems attributable to unnecessary interference can be avoided and the interference of the reflected light from the front surface or an inner layer at the wafer with the reference light can be measured with ease.

In addition, if the temperature of a component disposed inside the processing chamber, such as the electrode plate of the upper electrode, needs to be measured in addition to the temperature of the wafer, the light source 110 should be capable of emitting light with a wavelength that allows the light to be transmitted through the component as well. If the plurality of measurement targets $T_1$ through $T_n$ are constituted with a silicon material such as silicon or silicon oxide (e.g., quartz), as is likely in the case of a wafer and the electrode plate of the upper electrode, it is desirable that the light source 110 be capable of emitting low coherence light with a wavelength within a range of 1.0 to 2.5 μm that allows the light to be transmitted through the silicon material.

Light sources that generate the desirable type of low coherence light described above include, for instance, an SLD (super luminescent diode), an LED, a high brightness lamp (such as a tungsten lamp or a xenon lamp) and a super wideband wavelength light source. It is particularly desirable to use an SLD with its high brightness performance as the light source 110, among these low coherence light sources.

An optical fiber coupler, for instance, may be used as the splitter 120. However, the present invention does not limit the splitter 120 to an optical fiber coupler, and any type of splitter may be used as long as it is capable of splitting light into reference light and measurement light. The splitter 120 may be constituted with, for instance, a light waveguide channel-type wave splitter, a semi-transparent mirror (half mirror) or the like, instead.

The reference light reflecting means 140 may be constituted with, for instance, a reference mirror. The reference mirror may be, for instance, a corner cube prism or a plane mirror. It is particularly desirable to use a corner cube prism, which assures the desired parallelism between the reflected light and the incident light. However, as long as the reference light reflecting means is capable of reflecting the reference light, the reference mirror may be constituted with, for instance, a delay line, (as in the case of the optical path altering means constituted with a piezotube delay line, which is to be detailed later), instead of a corner cube prism.

It is desirable to constitute the drive means 142 for driving the reference light reflecting means 140 with a stepping motor that drives the reference light reflecting means 140 along a direction (the direction indicated by the arrows in FIG. 1) parallel to the direction in which the reference light enters. By employing a stepping motor, the distance over which the reference light reflecting means 140 is displaced can be detected with ease based upon the motor drive pulses. However, as long as it is capable of altering the optical path length of the light reflected from the reference light reflecting means, a piezotube delay line, a rectilinear displacement stage type delay line or a multilayer piezo delay line as well as a voice coil motor delay line, which employs a voice coil motor, may be used instead of the motor described above to constitute the optical path length altering means.

It is desirable to constitute the light receiving means 150 with, for instance, an inexpensive and compact photodiode. More specifically, the light receiving means 150 may be constituted with a PD (photo detector) achieved by using, for instance, an Si photodiode, an InGaAs photodiode or a Ge photodiode. However, the present invention is not limited to the examples listed above, and the light receiving means 150 may instead be constituted with an avalanche photodiode, a photomultiplier or the like, as long as the interference manifested by the measurement light from a given measurement target T and the reference light reflected from the reference light reflecting means 140 can be measured.

The reference light from the splitter 120 is transmitted via a reference light transmitting means (e.g., an optical fiber $F_Z$ equipped with a collimator mounted at the front tip of an optical fiber c) to a reference light radiation position at which it is radiated onto the reference light reflecting means 140. In addition, the measurement light from the splitter 120 is transmitted via a measurement light transmitting means (e.g., an optical fiber F equipped with a collimator, mounted at the front tip of an optical fiber b) to a measurement light radiation position at which the measurement light is radiated toward the measurement targets $T_1$ through $T_n$. It is to be noted that the reference light transmitting means or the measurement light transmitting means may be a collimate fiber instead of an optical fiber equipped with a collimator, instead.

The measurement light radiation position to which the measurement light is transmitted by the measurement light transmitting means should be set at a position at which the measurement light from the splitter 120 is radiated so as to be transmitted through all the measurement targets $T_1$ through $T_n$, starting at the measurement target $T_1$ (or $T_n$) disposed at the outermost position. From the radiation position thus set, the measurement light obtained by splitting the light originating from the light source 110 is transmitted through and reflected at the measurement targets $T_1$ through $T_n$, and, as a result, a second measurement beam transmitted through the measurement target $T_1$ and reflected at the front surface or the rear surface of the measurement target $T_2$, as well as the first measurement beam reflected at the front surface or the rear surface of the measurement target $T_1$ is obtained. Likewise, third through nth measurement beams are obtained in correspondence to the subsequent measurement targets. Namely, in correspondence to a measurement target $T_k$ ($1 \leq k \leq n$) among the measurement targets $T_1$ through $T_n$, the measurement light from the light source 110 is transmitted through the measurement targets $T_1$ through $T_{k-1}$ located at positions closer to the emission side, is radiated onto the measurement target $T_k$ and is reflected at the front surface or the rear surface of the measurement target $T_k$ as the kth measurement beam.

As described above, since the first through nth measurement beams corresponding to the measurement targets $T_1$ through $T_n$ can all be received via the optical fiber F equipped with a collimator by using the measurement light having been transmitted through a given measurement target as measurement light in the measurement for another measurement target, the temperatures of the measurement targets $T_1$ through $T_n$ can be measured all at once.

Figure 2:
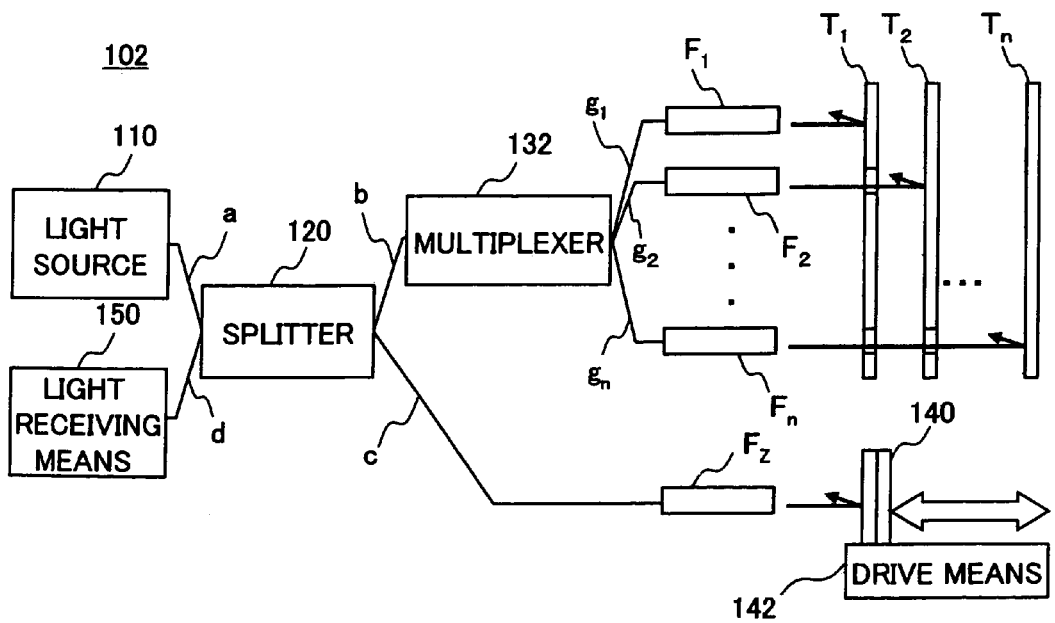
FIG. 2 is a block diagram schematically illustrating the structure adopted in a temperature measuring apparatus which represents a comparison example.

FIG. 2 shows the temperature measuring apparatus 102 equipped with a light source 110 that emits measurement light that is not transmitted through the measurement targets $T_1$ through $T_n$ as a comparison example. The temperature measuring apparatus 102 shown in FIG. 2 differs from the temperature measuring apparatus in FIG. 1 in that the measurement light from the splitter 120 is further split into first through nth measurement beams at an optical communication multiplexer (OADM: optical add/drop multiplexer) 132 and that the first through nth measurement beams are respectively radiated onto the measurement targets $T_1$ through $T_n$ via optical fibers $F_1$ through $F_n$ equipped with collimators disposed at the front tips of optical fibers $g_1$ through $g_n$.

Since the light source 110 of this temperature measuring apparatus 102 emits measurement light that is not transmitted through the measurement targets $T_1$ through $T_n$, holes must be formed at measurement targets to allow the measurement light to pass through and be used in the measurement for other measurement targets. As the number n of measurement targets increases, a greater number of holes will need to be formed at the given measurement target. This means that the holes will need to be formed at measurement targets through a special process.

In more specific terms, holes through which the second to nth measurement beams are to be passed to be used in the measurement at the other measurement targets $T_2$ through $T_n$ will need to be formed at the measurement target $T_1$, and holes for passing through the third through nth measurement beams to be used to measure the temperatures at the remaining measurement targets $T_3$ through $T_n$ will need to be formed at the measurement target $T_2$.

There is another problem in that the temperature at each measurement target must be measured individually by switching one of the first through nth measurement beams with the optical communication multiplexer 132, which requires the reference light reflecting means 140 to be scanned (driven) a number of times matching the quantity n of the measurement targets. This is bound to make the temperature measurement a laborious and time-consuming process.

In contrast, the light having been transmitted through a measurement target can then be utilized as measurement light in the measurement for another measurement target in the temperature measuring apparatus 100 shown in FIG. 1, and the measurement light obtained by splitting the light from the light source 110 is simply radiated toward the plurality of measurement targets $T_1$ through $T_n$ starting at the measurement target $T_1$ (or $T_n$) disposed at the outermost end position so that the light is transmitted through the individual measurement targets. The measurement light reflected at the various measurement targets $T_1$ through $T_n$ is received as the first through nth measurement beams. Thus, the interference waves attributable to the first through nth measurement beams and the reference light can be detected all at once simply by scanning the reference light reflecting means 140 such as a reference mirror thereby reducing the length of time required for the temperature measurement to the minimum.

As described above, the temperature measuring apparatus 100 in the embodiment adopting a simple structure in which the measurement light obtained by splitting the light originating from the light source 110 is radiated toward a plurality of measurement targets $T_1$ through $T_n$, enables a batch detection of the temperatures at the individual measurement targets $T_1$ through $T_n$. As a result, the layout of the optical fibers is facilitated and the labor required to install the temperature measuring apparatus is reduced since no special hole needs to be formed at any measurement target. In addition, since the temperatures at the plurality of measurement targets can be measured at once with a single temperature measuring apparatus, the length of time required for the temperature measurement can be minimized while keeping costs down to the lowest possible level.

It is to be noted that the intensity ratio of the measurement light and the reference light obtained by splitting the light from the light source at the splitter 120 should be, for instance, 1:1. Since this substantially equalizes the intensity of the measurement light to the intensity of the reference light, interference waveforms which facilitates measurement of, for instance, the peak interval or the like is achieved. However, the intensity levels of the measurement light and the reference light are not limited to this example.

In addition, a shutter means (not shown) capable of turning on/off the transmission of the measurement light may be disposed between the individual measurement targets $T_1$ through $T_n$. For instance, the interference waves attributable to the first measurement beam and the reference light alone can be obtained by driving the reference light reflecting means (e.g., a reference mirror) 140 while the measurement target $T_1$ is cut off from the measurement target $T_2$ with the shutter means so that the measurement light is not radiated onto the measurement targets $T_2$ through $T_n$. In addition, the interference waves attributable to the first and second measurement beams and the reference light alone can be obtained by driving the reference light reflecting means (e.g., a reference mirror) 140 while the measurement target $T_2$ is cut off from the measurement target $T_3$ with the shutter means so that the measurement light is not radiated onto the measurement targets $T_3$ through $T_n$. In this case, since the interference waveforms attributable to the first measurement beam and the reference light can be identified as described above by cutting off the measurement target $T_1$ from the measurement target $T_2$ with the shutter means, the interference waves attributable to the second measurement beam and the reference light can be specifically identified. The inclusion of the shutter means described above makes it possible to identify the specific measurement beam reflected from any of the measurement targets $T_1$ through $T_n$.

(Operation of the Temperature Measuring Apparatus)

In the temperature measuring apparatus 100 structured as described above, the light originating from the light source 110 enters one of the input terminals (input ports) at the splitter 120 via, for instance, an optical fiber a and the light having entered the input terminal is split at the splitter 120 into two beams each directed to one of the two output terminals (output ports), as shown in FIG. 1. The light directed to one of the output terminals (output ports) is radiated as measurement light onto the measurement targets $T_1$ through $T_n$ via the measurement light transmitting means which may be an optical fiber F equipped with a collimator disposed at the front tip of the optical fiber b, and the radiated light is then reflected at the front surfaces, the interfaces and the rear surfaces at the various layers of the individual measurement targets $T_1$ through $T_n$.

The other beam from the splitter 120, which is directed to the other output port (output port), is radiated as reference light via the reference light transmitting means such as an optical fiber $F_Z$ equipped with a collimator disposed at the front tip of an optical fiber c and is then reflected by the reference light reflecting means (e.g., a reference mirror) 140. The first through nth measurement beams reflected from the various measurement targets $T_1$ through $T_n$ subsequently enter the splitter 120 via the optical fiber F equipped with a collimator and the reference light reflected from the reference light reflecting means (e.g., a reference mirror) 140, too, enters the splitter 120 via the optical fiber $F_Z$ equipped with a collimator. The first through nth measurement beams then become reintegrated with the reference light and the reintegrated beams then enter the light receiving means 150 constituted with a PD which may be an Si photodiode, an InGaAs photodiode or a Ge photodiode, where the interference waveforms attributable to the first through nth measurement beams and the reference light are detected, via, for instance, an optical fiber d.

(Specific Examples of Interference Waveforms Attributable to Measurement Light and Reference Light)

Figure 3A:
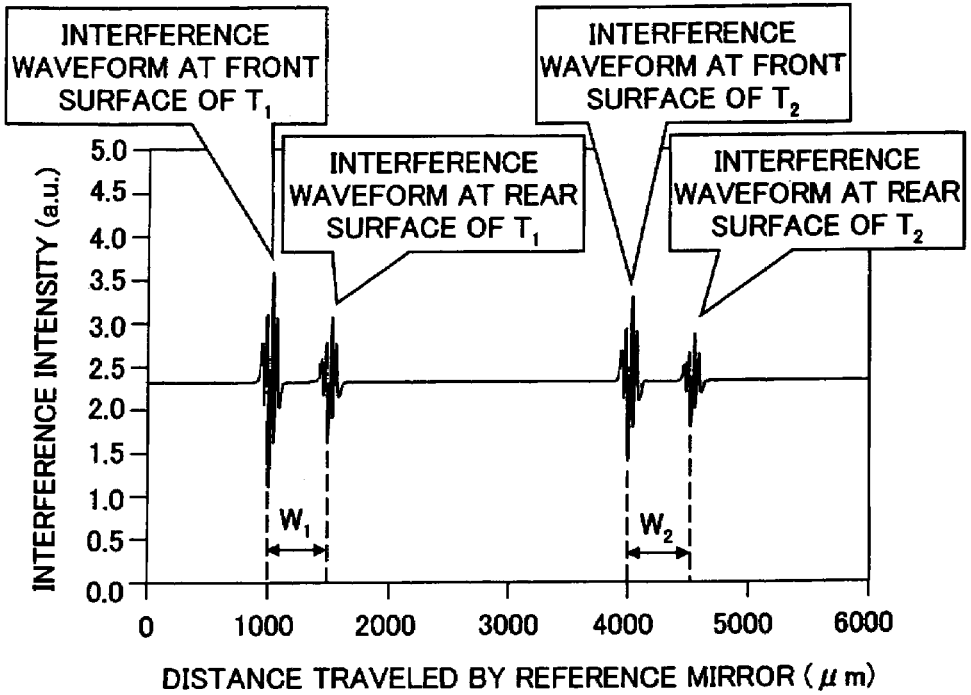
FIG. 3 presents specific examples of interference waves induced by measurement light and reference light in the temperature measuring apparatus achieved in the embodiment, with FIG. 3A presenting an example of interference waves manifesting before the temperatures at the temperature measurement targets change and FIG. 3B presenting an example of interference waves manifesting after the temperatures at the temperature measurement targets change.
Figure 3B:
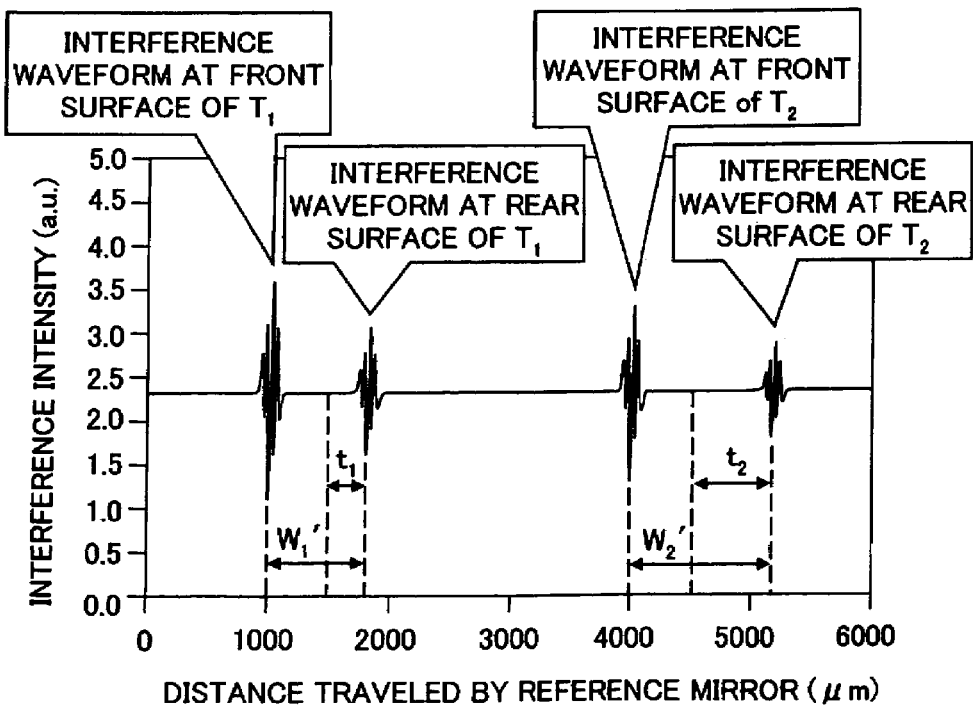

FIG. 3 shows interference waveforms attributable to measurement light and reference light that may be obtained with the temperature measuring apparatus 100. FIG. 3 shows the waveforms of the interference of the first and second measurement beams reflected at the measurement targets $T_1$ and $T_2$, with the reference light. FIG. 3A shows the interference waveforms observed prior to a temperature change, whereas FIG. 3B shows the interference waveforms observed after the temperature change. The vertical axis in FIG. 3 represents the interference intensity and the horizontal axis represents the distance by which the reference mirror is moved.

In addition, the light source 110 is a low coherence light source as described earlier. When a low coherence light source 110 which emits light with a small coherence length is used, intense interference occurs where the optical path length of the measurement light and the optical path length of the reference light match but the extent of interference is substantially lowered elsewhere under normal circumstances. Accordingly, by driving the reference light reflecting means (such as a reference mirror) 140 forward/backward along, for instance, the direction in which the reference light is radiated so as to alter the optical path length of the reference light, interference of the reflected measurement beams and the reflected reference light can be induced at any layer within the measurement targets $T_1$ and $T_2$ as well as at the front surfaces and the rear surfaces of the measurement targets $T_1$ and $T_2$ due to the difference between their refractive indices. Measurement of the temperatures along the depthwise direction at the measurement targets $T_1$ and $T_2$ is thus enabled.

As FIG. 3A and 3B indicate, an interference wave of the interference induced by the reference light at the front surface of the measurement target $T_1$ first manifests and then an interference wave in the reference light induced at the rear surface of the measurement target $T_1$ manifests as the reference light reflecting means (such as a reference mirror) 140 is scanned along the specific direction. As the reference light reflecting means 140 is further scanned, an interference wave induced by the reference light at the front surface of the measurement target $T_2$ manifests and then an interference wave induced by the reference light at the rear surface of the measurement target $T_2$ manifests. Thus, the interference waves manifesting at the front surfaces and the rear surfaces at the measurement targets $T_1$ and $T_2$ can be detected all at once simply with one scan of the reference light reflecting means 140.

(Interference Wave-Based Measurement of Temperature)

Next, an explanation is given on a method that may be adopted to measure a temperature based upon interference waves induced by the measurement light and the reference light. Methods that may be adopted to measure temperatures based upon interference waves include the temperature conversion method that is achieved by detecting a change in the optical path length resulting from a temperature change. In reference to the embodiment, a temperature conversion method achieved by detecting positional changes of the interference waveforms is explained.

As the measurement targets $T_1$ and $T_2$ are heated with a heater or the like, the temperature measurement targets $T_1$ and $T_2$ expand, inducing a change in their refractive indices. As a result, the positions of the interference waveforms shift and the intervals between the peaks in the interference waveform peaks change after the temperature change relative to those before the temperature change. During this process, if the temperatures at the individual measurement targets $T_1$ and $T_2$ change, the positions of the interference waveforms corresponding to each measurement target $T_1$ or $T_2$ shift, which alters the interval between the interference waveform peaks. By measuring the interval between the interference waveform peaks in correspondence to each of the measurement targets $T_1$ and $T_2$, the change in the temperature having occurred at the measurement target $T_1$ or $T_2$ can be detected. For instance, the interval between the interference waveform peaks change in correspondence to the distance over which the reference light reflecting means (e.g., a reference mirror) 140 moves in the temperature measuring apparatus 100 shown in FIG. 1, and thus, by measuring the distance over which the reference mirror is driven, indicating the interval between the interference waveform peaks, the change in temperature can be detected.

In the following specific explanation of the temperature measuring method, $d_1$ and $d_2$ represent the thicknesses of the measurement targets $T_1$ and $T_2$ undergoing the measurement as shown in FIG. 3 and $n_1$ and $n_2$ represent their refractive indices. As the reference mirror is scanned along the single direction while the measurement targets $T_1$ and $T_2$ are irradiated with the measurement light, two interference waveforms are obtained in correspondence to each of the measurement targets $T_1$ and $T_2$ as shown in FIG. 3A, one set of interference waveforms attributable to the interference of the first measurement beam reflected at the front surface and the rear surface of the measurement target $T_1$ and the reference light and the other set of interference waveforms attributable to the interference of the measurement light transmitted through the measurement target $T_1$ and reflected as the second measurement beam at the front surface and the rear surface of the measurement target $T_2$ and the reference light.

As the measurement targets $T_1$ and $T_2$ are heated with a heater or the like in this state, the temperatures at the measurement targets $T_1$ and $T_2$ rise and this change in the temperature causes the measurement targets $T_1$ and $T_2$ to expand, resulting in a change in their refractive indices. Thus, as shown in FIG. 3B, the peak position of one of the interference waveforms corresponding to each of the measurement targets $T_1$ and $T_2$ shifts relative to the position of the other interference waveform corresponding to the same measurement target and the interval between the interference waveform peaks becomes altered. For instance, FIG. 3B indicates that the positions of the interference waveforms corresponding to the rear surface relative to the positions of the interference waveforms corresponding to the front surfaces of the individual measurement targets $T_1$ and $T_2$ become shifted respectively by $t_1$ and $t_2$ compared to the corresponding positions in FIG. 3A. Consequently, the intervals between the peaks in the interference waveform peaks for the measurement targets $T_1$ and $T_2$ change from $W_1$ and $W_2$ in FIG. 3A to $W_1'$ and $W_2'$ in FIG. 3B.

Generally speaking, the extent to which the peak position of such an interference waveform shifts is dependent upon the coefficient of linear expansion $\alpha$ inherent to each layer at the measurement target along the depth d and the extent of change in the refractive index n is primarily dependent upon the temperature coefficient of refractive index change $\beta$ inherent to each layer. It is to be noted that the temperature coefficient of refractive index change $\beta$ is known to be also dependent upon the wavelength.

Accordingly, the thicknesses $d_1'$ and $d_2'$ of the measurement targets $T_1$ and $T_2$ after the temperature change are expressed as in (1-1) and (1-2) below. It is to be noted that in expressions (1-1) and (1-2) below, $\Delta T_1$ and $\Delta T_2$ respectively represent the temperature changes at the measurement targets $T_1$ and $T_2$. $\alpha_1$ and $\alpha_2$ respectively indicate the coefficients of linear expansion of the measurement targets $T_1$ and $T_2$ whereas $\beta_1$ and $\beta_2$ respectively indicate the temperature coefficients of refractive index change for the measurement targets $T_1$ and $T_2$. In addition, $d_1$ and $n_1$ respectively indicate the thickness and the refractive index at the measurement target $T_1$ prior to the temperature change and $d_2$ and $n_2$ respectively indicate the thickness and the refractive index at the measurement target $T_2$ prior to the temperature change.

$$d_1'=d_1 \cdot (1+\alpha_1 \cdot \Delta T_1), \; n_1'=n_1 \cdot (1+\Delta_1 \cdot \Delta T_1) \qquad (1\text{-}1)$$

$$d_2'=d_2 \cdot (1+\alpha_2 \cdot \Delta T_2), \; n_2'=n_2 \cdot (1+\alpha_2 \cdot \Delta T_2) \qquad (1\text{-}2)$$

As expressions (1-1) and (1-2) provided above indicate, the optical path lengths of the first and second measurement beams transmitted through and reflected from the measurement targets $T_1$ and $T_2$ change as the temperature changes. An optical path length is normally indicated as the product of the thickness d' and the refractive index n. Accordingly, with $L_1$ and $L_2$ respectively representing the optical path lengths of the first and second measurement beams transmitted through and reflected at the measurement targets $T_1$ and $T_2$ prior to the temperature change and $L_1'$ and $L_2'$ representing the optical path lengths after the temperatures at the measurement targets $T_1$ and $T_2$ change by $\Delta T_1$ and $\Delta T_2$ respectively, $L_1$ and $L_1'$ can be expressed as in (1-3) below and $L_2$ and $L_2'$ can be expressed as in (1-4) below.

$$L_1=d_1 \cdot n_1, \; L_1'=d_1' \cdot n_1' \qquad (1\text{-}3)$$

$$L_2=d_2 \cdot n_2, \; L_2'=d_2' \cdot n_2' \qquad (1\text{-}4)$$

Accordingly, the differences $(L_1'-L_1)$ and $(L_2'-L_2)$ between the optical path lengths of the first measurement beam at the measurement target $T_1$ and between the optical path lengths of the second measurement beam at the measurement target $T_2$ before and after the temperature change can be respectively expressed as in (1-5) and (1-6) below by incorporating and streamlining expressions (1-1), (1-2), (1-3) and (1-4) provided above. It is to be noted that expressions (1-5)

and (1-6) do not include any infinitesimal terms in consideration of $\alpha \cdot \beta << \alpha$ and $\alpha \cdot \beta << \beta$. Since the wafer thickness d and the refractive index n in the initial state prior to the heat application to the wafer can be assumed to be consistent over the entire wafer surface at all the measurement targets $T_1$ and $T_2$ L=d·n=$L_1$=$L_2$ is true in the initial state.

$$L_1' - L_1 = d_1' \cdot n_1' - d_1 \cdot n_1 \quad (1\text{-}5)$$
$$= d_1 \cdot n_1 \cdot (\alpha_1 + \beta_1) \cdot \Delta T_1$$
$$= L_1 \cdot (\alpha_1 + \beta_1) \cdot \Delta T_1$$

$$L_2' - L_2 = d_2' \cdot n_2' - d_2 \cdot n_2 \quad (1\text{-}6)$$
$$= d_2 \cdot n_2 \cdot (\alpha_2 + \beta_2) \cdot \Delta T_2$$
$$= L_2 \cdot (\alpha_2 + \beta_2) \cdot \Delta T_2$$

The optical path length of the measurement beam at each measurement target is equivalent to the interval between the peaks in the waveforms of the interference of the measurement beam and the reference light at the measurement target. For instance, the optical path lengths $L_1$ and $L_2$ of the first and second measurement beams at the individual measurement targets $T_1$ and $T_2$ prior to the temperature change are respectively equivalent to the intervals $W_1$ and $W_2$ between the peaks of the interference waveforms shown in FIG. 3A, and the optical path lengths $L_1'$ and $L_2'$ of the first and second measurement beams at the measurement targets $T_1$ and $T_2$ following the temperature change are respectively equivalent to the intervals $W_1'$ and $W_2'$ between the peaks of the interference waveforms shown in FIG. 3B. Thus, the interval between the peaks of the waveforms of the interference of the measurement beam and the reference light at each measurement target can be measured in correspondence to the distance by which the reference light reflecting means (e.g., reference mirror) is moved in the temperature measuring apparatus 100 shown in FIG. 1.

Accordingly, as long as the coefficients of linear expansion $\alpha_1$ and $\alpha_2$ the temperature coefficients of refractive index change $\beta_1$ and $\beta_2$ of the measurement targets $T_1$ and $T_2$ are ascertained in advance, the temperatures at the measurement targets $T_1$ and $T_2$ can be calculated through conversion by using expressions (1-5) and (1-6), once the intervals between the peaks of the interference waveforms of the interference of the measurement beams and the reference light at the individual measurement targets $T_1$ and $T_2$ are measured.

When converting an interference waveform peak interval to a temperature as described above, it is necessary to ascertain in advance the coefficient of linear expansion $\alpha$ and the temperature coefficient of refractive index change $\beta$ since the coefficient of linear expansion $\alpha$ and the temperature coefficient of refractive index change $\beta$ affect the optical path length indicated by the interval between the interference waveform peaks. Generally speaking, the coefficient of linear expansion a and the temperature coefficient of refractive index change $\beta$ of a potential measurement target such as a wafer may be dependent upon the temperature in certain temperature ranges. For instance, since the coefficient of linear expansion $\alpha$ does not normally change significantly as long as the temperature of the substance is in the range of approximately 0 through 100° C., the coefficient of linear expansion may be regarded to be constant in this range. However, once the temperature exceeds 100° C., the coefficients of linear expansion of some materials start to change by greater extents as the temperature becomes higher and, in such a case, the temperature dependency cannot be disregarded. Likewise, the temperature dependency of the temperature coefficient of refractive index change $\beta$ cannot be disregarded in a certain temperature range, either.

For instance, it is known that the coefficient of linear expansion a and the temperature coefficient of refractive index change $\beta$ of silicon (Si) used to constitute wafers can be approximated with quadratic curves in the temperature range of 0 through 500° C. Refer to, for instance, an article written by J. A. McCaulley, V. M. Donelly et al. (J. A. McCaulley, V. M. Donelly, M. Vernon and I. Taha, "Temperature dependence of the near-infrared refractive index of silicon, gallium arsenide and indium phosphide" Phy. Rev. B49, 7408, 1994) for details.

As described above, the coefficient of linear expansion $\alpha$ and the temperature coefficient of refractive index change $\beta$ are dependent on the temperature and accordingly, by ascertaining the values of the coefficient of linear expansion $\alpha$ and the temperature coefficient of refractive index change $\beta$ corresponding to specific temperatures in advance through testing or the like, storing the data obtained through the testing or the like as temperature conversion reference data in memory (e.g., a memory 440 in a control device 400 to be described later) and executing temperature conversion based upon the temperature conversion reference data the temperature can be calculated with an even higher level of accuracy.

It is to be noted that the temperatures may be measured based upon the interference waveforms attributable to the measurement light and the reference light by adopting a method other than that described above. For instance, the relationships between the optical path lengths corresponding to the individual measurement targets $T_1$ and $T_n$ and their temperatures may be ascertained in advance through testing or the like, and the optical path lengths (the peak widths in the interference waveforms) measured based upon the interference waves attributable to the measurement beams corresponding to the measurement targets $T_1$ and $T_n$ and the reference light may be directly converted to temperature values based upon the data obtained through the testing or the like, which may be stored in advance as temperature conversion reference data in memory (e.g., the memory 440 of the control device 400 to be detailed later). This alternative allows the results of the measurement of the interference waves attributable to the measurement light and the reference light to be converted to a temperature value with ease even when the coefficient of linear expansion $\alpha$ and the temperature coefficient of refractive index change are not known.

More specifically, when $L_i$ represents the optical path length at an unknown temperature $t_i$, $L_t$ represents the optical path length at a given temperature t, $\alpha$ represents the coefficient of linear expansion and $\beta$ represents the temperature coefficient of refractive index change, the given temperature t in a temperature range over which the temperature dependency of the coefficient of linear expansion $\alpha$ and the temperature dependency of the temperature coefficient of refractive index change $\beta$ can be disregarded is expressed as in (2-1) below. Expressions (2-1) is identical to expression (1-5), provided that $L_1'$=$L_t$, $L_1$=$L_i$, $\Delta T_1$=t–$t_i$, $\alpha_1$=$\alpha$ and $\beta_1$=$\beta$. Expression (2-1) can be simplified so as to express the given temperature t as in (2-2) below. When the temperature dependencies of the coefficient of linear expansion $\alpha$ and the temperature coefficient of refractive index change $\beta$ can be disregarded, $\alpha$+$\beta$ in (2-2) can be regarded as constant.

Accordingly, expression (2-2) can be rewritten as a linear expression (2-3) by substituting $A_1$ and $B_1$ for the constant coefficients.

$$L_t - L_i = L_i \cdot (\alpha + \beta) \cdot (t - t_i) \quad (2\text{-}1)$$

$$t = (1/(\alpha + \beta)) \cdot (L_t/L_i) - (1/(\alpha + \beta) + t_i) \quad (2\text{-}2)$$

$$t = A_1 \cdot (L_t/L_i) + B_1 \quad (2\text{-}3)$$

If, on the other hand, the temperature dependencies of the coefficient of linear expansion $\alpha$ and the temperature coefficient of the refractive index change $\beta$ cannot be disregarded, the temperature t may be indicated with quadratic expression (2-4). $A_2$, $B_2$ and $C_2$ each represent a coefficient.

$$t = A_2 \cdot (L_t/L_i)^2 + B_2 \cdot (L_t/L_i) + C_2 \quad (2\text{-}4)$$

Figure 4:
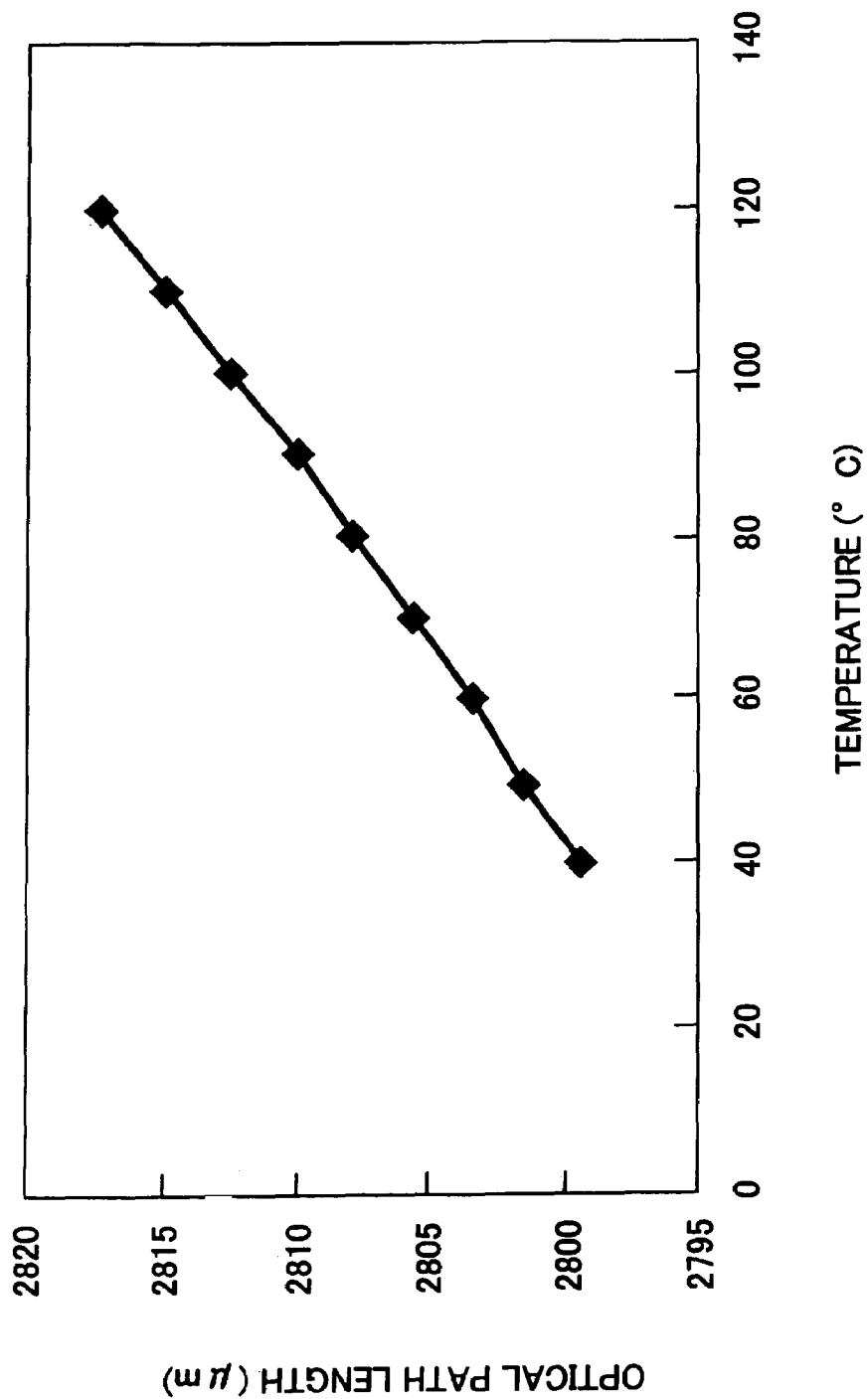
FIG. 4 shows the test results representing a specific example of the relationship observed between the temperature of a measurement target and the optical path length.

The coefficients $A_1$ and $B_1$ in expression (2-3) and the coefficients $A_2$, $B_2$ and $C_2$ in expression (2-4) can be individually determined by actually measuring the optical path lengths at several different temperatures through testing. For instance, assuming that the test results such as those shown in FIG. 4 are obtained with regard to the relationship between the temperature and the optical path length, the coefficients in expression (2-4) are calculated to be; $A_2 = -1.2496 \times 10^5$, $B^2 = -2.6302 \times 10^5$ and $C_2 = -1.3802 \times 10^5$ when the known temperature $t_i$ is 40° C. and the corresponding optical path length is expressed as $L_i = L_{40}$.

By storing the coefficients in expression (2-4) thus ascertained through testing as temperature conversion reference data in memory in advance (e.g., the memory 440 or the like of the control device 400 to be detailed later) $L_t/L_{40}$ can be determined in correspondence to the optical path length $L_t$ measured based upon the interference waves attributable to the measurement light and the reference light. The optical path length $L_t$ can then be converted to the temperature t by substituting $L_t/L_{40}$ for $L_t/L_i$ in expression (2-4).

It is to be noted that the temperature may be measured based upon the interference waves attributable to the measurement light and the reference light by adopting a method other than that described above. For instance, the temperature may be determined in correspondence to the absorption intensity change resulting from a temperature change or it may be determined based upon both the optical path length change resulting from a temperature change and the absorption intensity change resulting from the temperature change.

(Temperature Measuring System Achieved in Second Embodiment)

Figure 5:
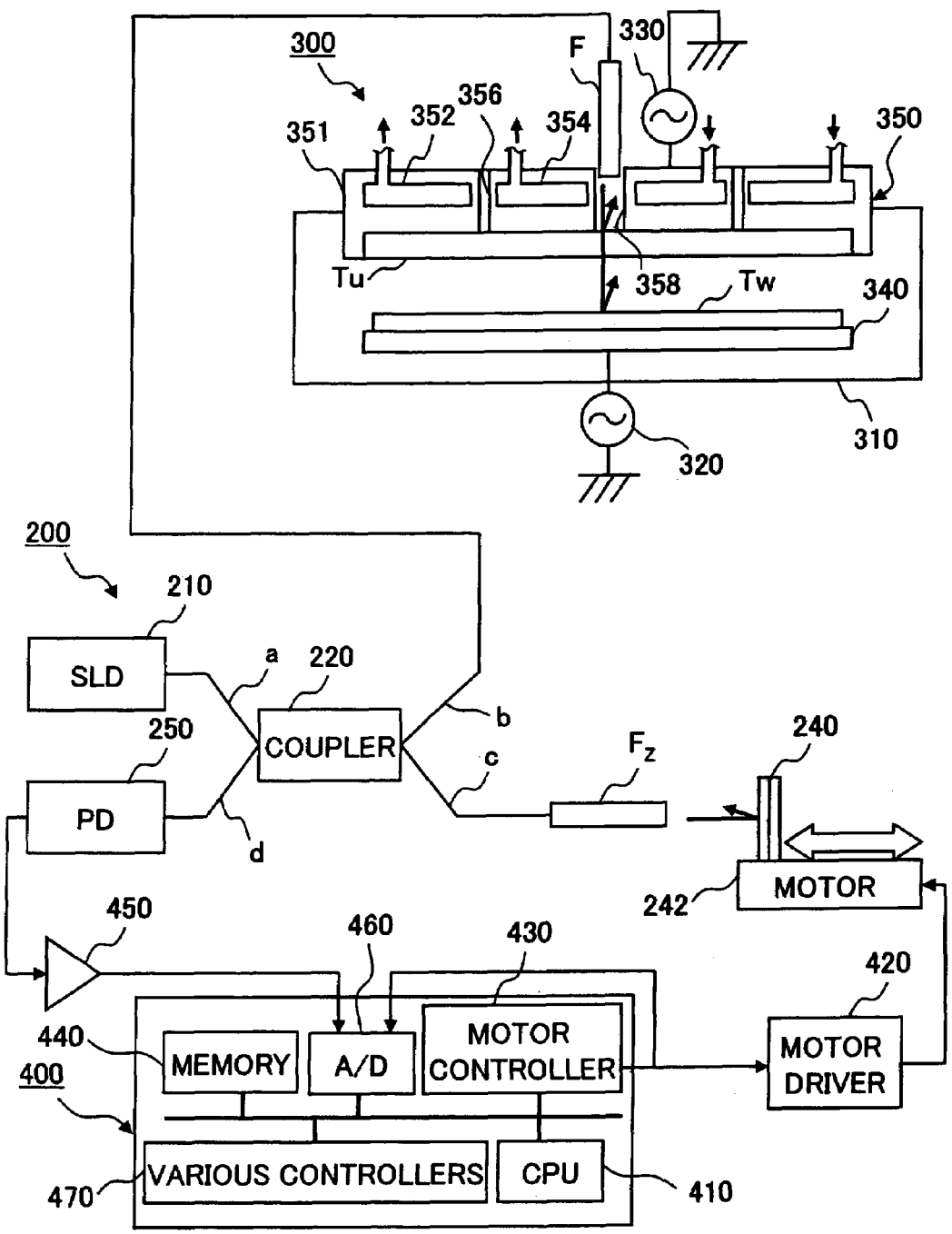
FIG. 5 is a schematic block diagram of the structure adopted in a specific example of the temperature measuring system for a substrate processing apparatus achieved in a second embodiment of the present invention.

Next, the temperature measuring system for a substrate processing apparatus achieved in the second embodiment is explained in reference to drawings. The temperature measuring system for a substrate processing apparatus achieved in the second embodiment represents a specific example in which the temperature measuring apparatus in the first embodiment is adopted in conjunction with a substrate processing apparatus. FIG. 5 schematically shows the structure of the temperature measuring system achieved in the second embodiment. An explanation is given in reference to the embodiment on an example in which the present invention is adopted in the measurement of the temperatures at two temperature measurement targets $T_1$ (e.g., an electrode plate Tu of the upper electrode) and $T_2$ (e.g., a wafer Tw) set so as to face opposite each other in the substrate processing apparatus such as a plasma etching apparatus.

The temperature measuring system in FIG. 5 is primarily constituted with a temperature measuring apparatus 200, a substrate processing apparatus 300 and a control device 400. A light source of the temperature measuring apparatus 200 in FIG. 5, corresponding to the light source 110 in FIG. 1, is a low coherence light source constituted with a low coherence SLD 210 capable of emitting low coherence light. The splitter 120 for splitting the light originating from the light source 110 into measurement light and reference light is constituted with, for instance, a 2×2 optical fiber coupler 220, the light receiving means 150 is constituted with a PD 250 achieved by using, for instance, a Ge photodiode, the reference light reflecting means 140 is constituted with, for instance, a reference mirror 240 and the drive means 142 is constituted with a stepping motor 242 which drives the reference mirror 240 in the temperature measuring apparatus 200.

The light source 110 constituted with the SLD 210 or the like, from which the measurement light originates, should be capable of emitting light that can be transmitted through, at least, the electrode plate Tu of an upper electrode 350. Since such measurement light is transmitted through the electrode plate Tu of the upper electrode 350 and is their radiated onto the wafer Tw, the transmitted light can be utilized as measurement light in the measurement of the temperature at the wafer Tw. For instance, the light source 110 should be capable of emitting light with a wavelength in a range of 1.0 to 2.5 μm which allows the light to be transmitted through a silicon material such as silicon or a silicon oxide film (e.g., quartz) likely to be used to constitute the electrode plate Tu of the upper electrode 350.

The substrate processing apparatus 300 includes a processing chamber 210 where a specific type of processing such as etching or film formation is executed on the wafer Tw, as shown in FIG. 5. Inside the processing chamber 310, an upper electrode 350 and a lower electrode 340 facing opposite the upper electrode 350 are disposed. The lower electrode 340 also functions as a stage on which the wafer Tw is placed. The wafer Tw is carried into the processing chamber 210 through a gate valve (not shown) that may be installed at a side surface of the processing chamber 310. High-frequency power sources 320 and 330 that apply predetermined levels of high-frequency power are respectively connected to the lower electrode 340 and the upper electrode 350.

The upper electrode 350 is structured so as to support the electrode plate Tu, i.e., the measurement target $T_2$, located at its lowermost position with an electrode support member 351. The electrode plate Tu may be formed by using, for instance, a silicon material (silicon, silicon oxide or the like), whereas the electrode support member 351 may be constituted of, for instance, aluminum.

At the top of the upper electrode 350, an intake pipe (not shown) through which a specific type of processing gas is supplied is mounted. Numerous delivery holes (not shown) are formed at the electrode plate Tu so that the processing gas having been supplied through the intake pipe is let out evenly toward the wafer Tw placed on the lower electrode 340.

A cooling means is disposed at the upper electrode 350. The cooling means may be provided as a coolant passage formed inside the electrode support member 351 at the upper electrode 350, and the temperature of the upper electrode 350 is controlled by circulating a coolant through the coolant passage. Such a coolant passage should be formed in a substantially circular shape. There may be two coolant passage systems, e.g., an outer coolant passage 352 through which the coolant is circulated to cool the outside area of the surface of the upper electrode 350 and an inner coolant passage 354 through which the coolant is circulated to cool the inside area of the surface. The coolant is supplied through a supply pipe into the outer coolant passage 352 and the inner coolant passage 354, as indicated by the arrows in FIG. 5. The coolant having circulated through the individual coolant passages 352 and 354 is discharged through a discharge pipe and the coolant is then allowed to return to an external refrigeration unit (not shown) for recirculation. A single type of coolant may be used to circulate through these two coolant passage systems, or two different types of coolant may be used for the circulation through the individual coolant passages. It is to be noted that the cooling means provided at the upper electrode 350 is not limited to the two coolant passage systems shown in FIG. 5. For instance, it may be achieved as a single coolant passage system, or it may be achieved as a single coolant passage system which splits into two passage branches.

At the electrode support member 351, a low heat transfer layer 355 is disposed between the outer area over which the outer coolant passage 352 is formed and the inner area over which the inner coolant passage 354 is formed. Since the low heat transfer layer 356 inhibits heat transfer between the outer area and the inner area at the electrode support member 351, it is possible to vary the temperature at the outer area from the temperature at the inner area through coolant control at the outer coolant passage 352 and the inner coolant passage 354. Thus, the temperature within the surface of the upper electrode 350 can be controlled efficiently and accurately.

The wafer Tw is carried into the substrate processing apparatus 300 described above through the gate valve on, for instance, a transfer arm. The wafer Tw having been transferred into the processing chamber 310 is then placed on the lower electrode 340, the high-frequency power is applied to the upper electrode 350 and the lower electrode 340, and the specific type of processing gas is supplied into the processing chamber 210 through the upper electrode 350. As a result, the processing gas having been supplied through the upper electrode 350 is raised to plasma with which a specific type of processing such as etching is executed at the surface of the wafer Tw.

The reference light from the optical fiber coupler 220 at the temperature measuring apparatus 200 described earlier is transmitted to a reference light radiation position at which it is radiated toward the reference mirror 240 via the reference light transmitting means, e.g., the optical fiber $F_Z$ equipped with a collimator. In addition, the measurement light departing the optical fiber coupler 220 is transmitted via the measurement light transmitting means, e.g., the optical fiber F equipped with a collimator, to a measurement light radiation position at which the measurement light is radiated toward the measurement targets, i.e., the electrode plate Tu and the wafer Tw, from above the electrode plate Tu of the upper electrode 350. More specifically, the optical fiber F equipped with a collimator is disposed so that the measurement light is radiated toward the electrode plate Tu and the wafer Tw through a through hole 358 formed at, for instance, the center of the electrode support member 351 of the upper electrode 350.

It is to be noted that while an explanation is given above on an example in which the in-plane position at which the measurement light is radiated, i.e., the position within the plane ranging along the surfaces of the electrode plate Tu and the wafer Tw, at which the measurement light is radiated, is set at the center, the present invention is not limited to this example and the measurement light may be radiated at any position as long as it is radiated onto the electrode plate Tu and the measurement light transmitted through the electrode plate Tu is then radiated onto the wafer Tw.

The control device 400 controls the various units constituting the temperature measuring apparatus 200 and the substrate processing apparatus 300. The control device 400 includes a CPU (central processing unit) 410 constituting the main unit of the control device, a motor controller 430 that controls the stepping motor 242 for driving the reference mirror 240 via a motor driver 420, a memory 440 constituting a ROM (read-only memory) in which program data and the like to be used by the CPU 410 to control the individual units, a RAM (random access memory) containing a memory area and the like to be used by the CPU 410 when it executes various types of data processing and the like, an A/D convertor 460 that executes analog/digital conversion of output signals (indicating the results of interference wave measurement obtained by radiating the measurement light) input thereto from the PD 250 via a buffer 450 and a control signal (e.g., a drive pulse) provided by the motor controller 430 and inputs the results of the conversion, various controllers 470 that control the individual units constituting the substrate processing apparatus 300 and the like. The control device 400 may measure the position to which the reference mirror 240 is moved or the distance by which the reference mirror 240 is moved based upon the control signal (e.g., a drive pulse) for the stepping motor 242 output from the motor controller 430, or it may measure the position to which the reference mirror 240 is moved or the distance by which the reference mirror 240 is moved based upon an output signal provided by a linear encoder mounted at the motor 242. In addition, the motor 242 does not need to be a stepping motor and instead, a voice coil motor or the like may be used.

The temperature measuring system structured as described above allows the interference waves attributable to the first and second measurement beams reflected by the electrode plate Tu of the upper electrode 350 and the wafer Tw and the reference light to be detected together simply by scanning the reference mirror 240 once. In other words, the temperatures at different types of measurement targets such as the electrode plate Tu of the upper electrode 350 and the wafer Tw can be measured all at once.

Figure 6:
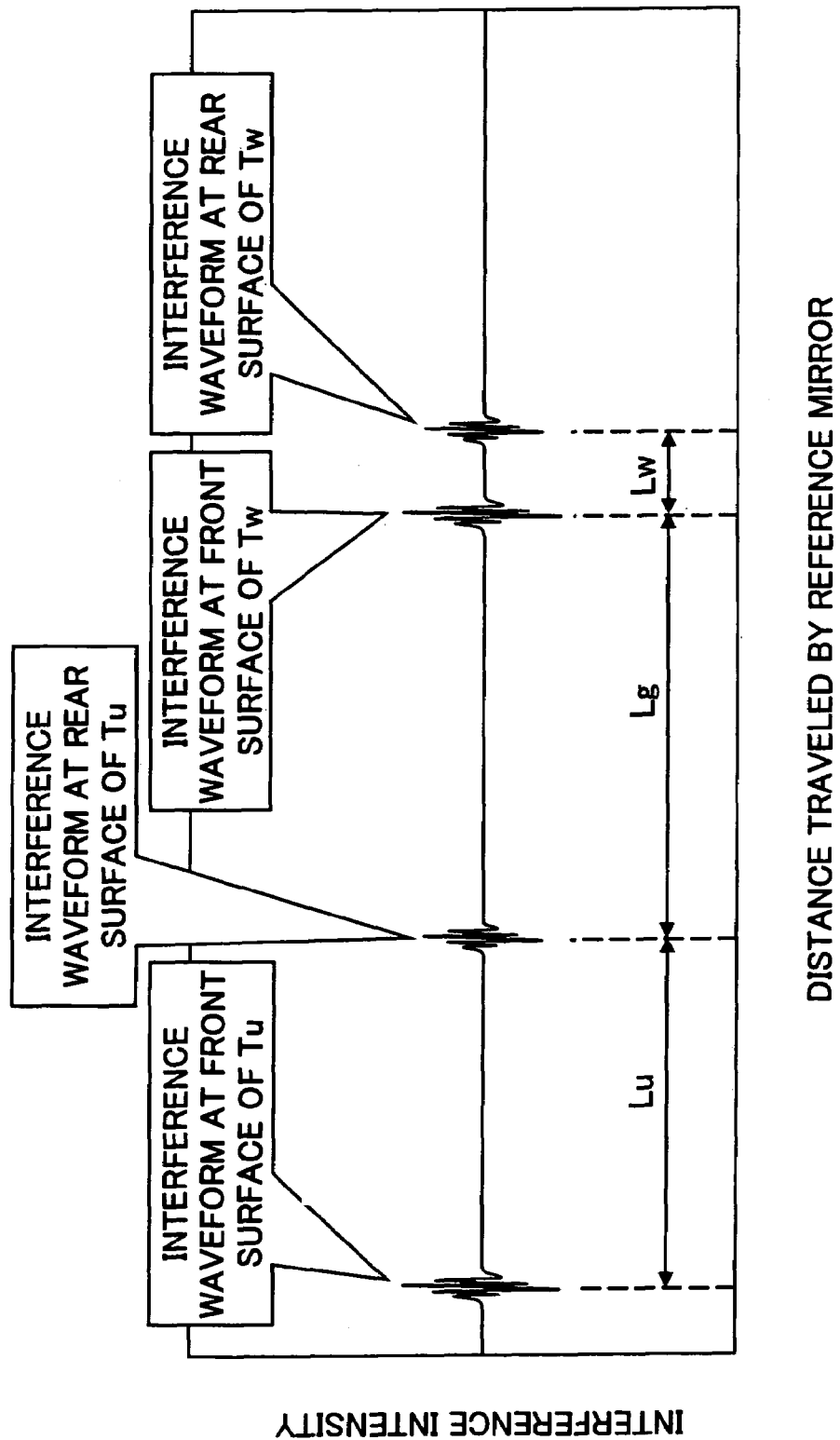
FIG. 6 presents a specific example of interference waves induced by measurement light and reference light in the temperature measuring apparatus achieved in the embodiment.

FIG. 6 shows interference waveforms that may be obtained with the temperature measurement system shown in FIG. 5. FIG. 6 shows the waveforms of the interference of the first and second measurement beams reflected at the electrode plate Tu of the upper electrode 350 and the wafer Tw, with the reference light. The vertical axis in FIG. 6 represents the interference intensity and the horizontal axis represents the distance by which the reference mirror is moved.

As FIG. 6 indicates, an interference wave induced at the front surface of the electrode plate Tu of the upper electrode 350 by the reference light first manifests and then an interference wave induced at the rear surface of the electrode plate Tu of the upper electrode 350 by the reference light manifests as the reference mirror 240 is scanned along the specific direction. As the reference light reflecting mirror 240 is further scanned, an interference wave induced by the reference light at the front surface of the wafer Tw then manifests and an interference wave induced by the reference light at the rear surface of the wafer Tw manifests. Thus, the interference waves manifesting at the front surfaces and the rear surfaces at the electrode plate Tu of the upper electrode 350 and the wafer Tw can be detected all at once with a single scan of the reference light reflecting mirror 240.

The peak interval Lu in the waveforms of the interference manifesting at the front surface and the rear surface of the electrode plate Tu of the upper electrode 350 is equivalent to the optical path length of the measurement light extending from the front surface to the rear surface of the electrode plate Tu at the upper electrode 350. In addition, the peak interval Lw in the waveforms of the interference manifesting at the front surface and the rear surface of the wafer Tw is equivalent to the optical path length of the measurement light extending from the front surface to the rear surface of the wafer Tw. It is to be noted that the peak interval Lg in the waveforms of the interference manifesting at the rear surface of the electrode plate Tu of the upper electrode 350 and the front surface of the wafer Tw is equivalent to the length of the optical path of the measurement light traveling through the gap (the distance) between the electrode plate Tu of the upper electrode 350 and the wafer Tw.

Based upon the results of the measurement of the measurement light optical path lengths at the electrode plate Tu of the upper electrode 350 and the wafer Tw thus obtained, the control device 400 determines the temperatures at the electrode plate Tu of the upper electrode 350 and the wafer Tw through the temperature conversion method such as that explained earlier. More specifically, it converts the measurement light optical path lengths at the electrode plate Tu of the upper electrode 350 and the wafer Tw to temperature values based upon the temperature conversion reference data or the like explained earlier stored in, for instance, the memory 440 in advance.

As described above, in the temperature measuring system shown in FIG. 5, the measurement light having been transmitted through the electrode plate Tu of the upper electrode 350 is utilized as measurement light in the measurement for the wafer Tw. As a result, the interference waveforms attributable to the measurement light and the reference light can be obtained in correspondence to the wafer Tw as well as the electrode plate Tu of the upper electrode 350 through a single scan of the reference mirror 240. Thus, the temperatures of different types of measurement targets, i.e., the electrode plate Tu of the upper electrode 350 and the wafer Tw, can be detected at once in a simple structure in which the measurement light obtained by splitting the light originating from the SLD 210 is radiated toward the electrode plate Tu of the upper electrode 350 and the wafer Tw.

Consequently, the layout of the optical fibers is facilitated and the labor required to install the temperature measuring apparatus 200 is reduced since no special hole needs to be formed at the electrode plate of the upper electrode 350. In addition, since the temperatures of the electrode plate Tu of the upper electrode 350 and the wafer Tw can be measured at once with a single temperature measuring apparatus 200, the length of time required for the temperature measurement can be minimized while keeping the costs down to the lowest possible level.

(Temperature Measuring System Achieved in Third Embodiment)

In reference to drawings, the temperature measuring system for a substrate processing apparatus achieved in the third embodiment is explained. The temperature measuring system in the third embodiment is an improvement over the temperature measuring system in the second embodiment in that the distance over which the reference mirror is required to move is further reduced.

Namely, since the electrode plate Tu of the upper electrode 350 and the wafer Tw, equivalent to the measurement targets $T_1$ and $T_2$, undergoing the measurement in the temperature measuring system in the second embodiment are distanced from each other over a gap and accordingly, the interference waveforms of the interference manifested by the measurement light and the reference light in correspondence to the electrode plate Tu of the upper electrode 350 and the interference waves of the interference manifested by the measurement light and the reference light in correspondence to the wafer Tw, too, are measured over an interval equivalent to the optical path length Lg extending over the gap (the distance between the electrode plate and the wafer). This means that in order to measure the temperatures at the electrode plate Tu of the upper electrode 350 and the wafer Tw through a single scan of the reference mirror 240, the reference mirror 240 needs to travel by a greater distance in correspondence to the gap (the distance) between the electrode plate Tu of the upper electrode 350 and the wafer Tw. At the same time, the optical path length Lg extending over the gap (the distance) bears no relevance in the measurement of the temperatures at the electrode plate Tu of the upper electrode 350 and the wafer Tw, and thus should be minimized so as to reduce the length of time required for the temperature measurement.

The temperature measuring system in the third embodiment is achieved by taking this point into consideration. The improvement over the second embodiment is realized by disposing a detour optical path in the middle of the measurement light optical path constituting the measurement light transmitting means, by connecting it in parallel to the measurement light optical path. In this structure, the measurement beam having passed through the detour optical path and the measurement beam which has not passed through the detour optical path are both radiated toward the measurement targets increasing the interference patterns of the interference between the measurement light and the reference light. Thus, by adjusting the extent of offset manifesting with regard to the instances of interference of the various light beams through an adjustment of the optical path length of the detour optical path, the interference waveforms needed for the measurement alone can be made to manifest in close proximity to each other. Consequently, the distance over which the reference mirror needs to travel can be reduced.

Figure 7:
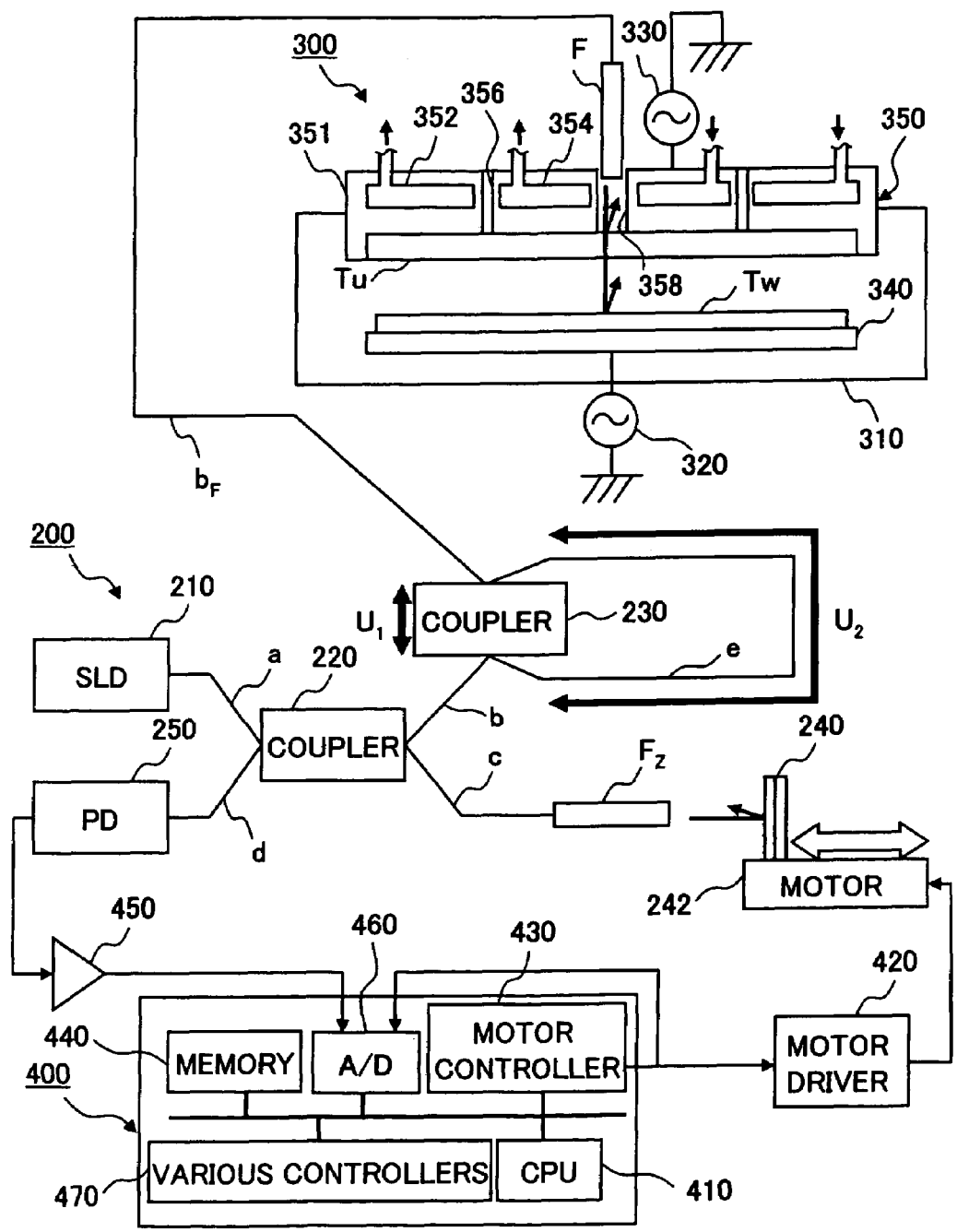
FIG. 7 is a schematic block diagram of the structure adopted in a specific example of the temperature measuring system for a substrate processing apparatus achieved in a third embodiment of the present invention.

The following is an explanation of a specific structural example that may be adopted in the temperature measuring system in the third embodiment given in reference to FIG. 7. The measurement light transmitting means in the temperature measuring system shown in FIG. 7 includes a detour optical path connection splitter such as a 2×2 optical fiber coupler 230 to be used to connect in parallel an optical fiber e, which is to constitute the detour optical path in the middle of the measurement light optical path extending from the optical fiber coupler 220. It is to be noted that the optical fiber coupler 230 has a structure similar to that of the optical fiber coupler 220.

One of the output terminals (output ports) from the optical fiber coupler 220 is connected via an optical fiber b to one of the input terminals (input ports) at the optical fiber coupler 230. One of the output terminals (output ports) at the optical fiber coupler 230 is connected with an optical fiber F equipped with a collimator mounted at the front tip of an optical fiber $b_F$. In addition, the other input terminal (input port) and the other output terminal (output port) at the optical fiber coupler 230, connected with the optical fiber e constituting the detour optical path, forms a loop.

At the measurement light transmitting means structured as shown in FIG. 7, the measurement light exiting one of the output terminals (output ports) from the optical fiber coupler 220 is split into two beams which are then directed to two separate output terminals (output ports) at the optical fiber coupler 230. The measurement beam having been directed to one of the output terminals (output ports) is radiated through the optical fiber $b_F$ toward the electrode plate Tu of the upper electrode 350 and the wafer Tw from the front tip of the optical fiber F equipped with a collimator.

The measurement beam directed to the other output terminal (output port) at the optical fiber coupler 230 having reverted via the optical fiber e to the other input terminal (input port) at the optical fiber coupler 230 and is further split into two beams which are directed to the two separate output terminals (output ports) at the optical fiber coupler 230. The measurement beam directed to one of the output terminals (output ports) is radiated through the optical fiber $b_F$ toward the electrode plate Tu of the upper electrode 350 and the wafer Tw from the front tip of the optical fiber F equipped with a collimator.

With the detour optical path disposed in the middle of the optical path of the measurement light constituting the measurement light transmitting means by connecting the detour optical path in parallel to the measurement light optical path, the measurement light obtained by splitting the light from the SLD 210 travels through the path extending via an optical path $U_1$ within the optical fiber coupler 230 or the path extending via the detour optical path $U_2$ at the optical fiber e, both as the outbound measurement light radiated from the optical fiber F equipped with a collimator toward the electrode plate Tu of the upper electrode 350 and the wafer Tw and as the inbound measurement light received as reflected measurement beams from the electrode plate Tu of the upper electrode 350 and the wafer Tw via the optical fiber F equipped with a collimator. In other words, the measurement light travels through more diverse optical path patterns.

An explanation is now given on the optical paths of such measurement light, given in reference to a drawing. FIG. 8 shows the relationship between the measurement light optical path type (pattern) and the corresponding path through which the measurement light travels. The measurement light paths include outbound paths through which the measurement light is output from the optical fiber coupler 220 and is directed toward the electrode plate Tu of the upper electrode 350 and the wafer Tw and inbound paths through which the measurement beams reflected from the electrode plate Tu of the upper electrode 350 and the wafer Tw are input to the optical fiber coupler 220.

Four measurement light optical path types (patterns), optical paths A through D, as shown in FIG. 8, are formed in conjunction with the detour optical path shown in FIG. 7 through varying combinations of an outbound path and an inbound path. Both the outbound measurement light and the inbound measurement light travel via the optical path $U_1$ in the optical path pattern A with the smallest optical path length. The outbound measurement light travels via the optical path $U_1$ and the measurement light then returns via the detour optical path $U_2$ in the optical path pattern B. The outbound measurement light travels via the detour optical path $U_2$ and it then returns via the optical path $U_1$ in the optical path pattern C, and in this case, the total optical path length is equal to that of the optical path pattern B. The outbound measurement light travels via the detour optical path $U_2$ and then the measurement light returns via the detour optical path $U_2$ in the optical path pattern D, having the greatest optical path length.

Figure 9:
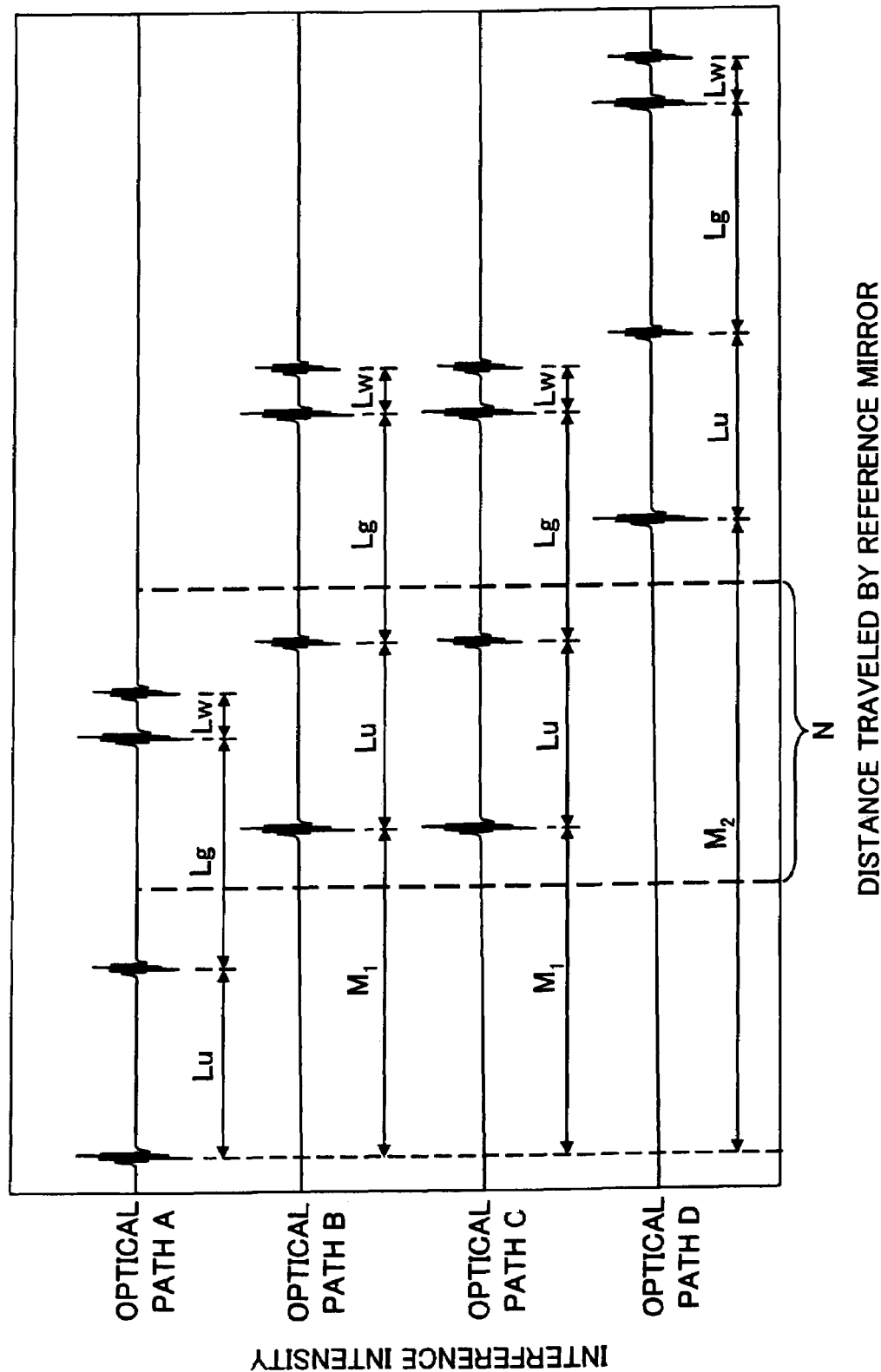
FIG. 9 presents a specific example of interference waves induced by measurement light and reference light with the temperature measuring apparatus achieved in the embodiment.

FIG. 9 shows the interference waveforms of the interference manifested by the measurement beams having traveled through the optical paths A through D and the reference light. FIG. 9 shows the interference waveforms obtained by scanning the reference mirror along a single direction just once. The distance over which the reference mirror is made to travel is indicated along the horizontal axis whereas the interference intensity is indicated along the vertical axis. It is to be noted that while FIG. 9 shows the interference waveforms corresponding to the individual optical paths A~D without overlapping them so as to ensure that the individual instances of interference can easily be distinguished, composite waveforms in which the light interference waveforms corresponding to the optical paths A through D are all integrated are actually measured.

As shown in FIG. 9, the interference of the light corresponding to each of the optical paths A~D invariably manifests as the interference waveforms detected in correspondence to the front surface and the rear surface of the electrode plate Tu of the upper electrode 350 and the interference waves detected in correspondence to the front surface and the rear surface of the wafer Tw with peak intervals Lu, Lg and Lw as in the interference of light shown in FIG. 6. This means that similar measurement results are obtained in correspondence to the interference of the measurement beams having traveled through the different optical paths A through D. Accordingly, the peak interval Lw between the peaks in the interference waveforms corresponding to the wafer Tw may be determined based upon the interference of the light having traveled through the optical path pattern A and the peak interval Lu of the interference waves at the electrode plate Tu of the upper electrode 350 may be determined based upon the interference of the light having traveled through the optical path pattern B.

In addition, since the optical paths A through D have varying optical path lengths, the first interference waves at the front surface of the electrode plate Tu of the upper electrode 350, attributable to the individual instances of interference of the light having passed through the optical paths A through D, appear with offsets corresponding to the optical path lengths of the individual optical paths A through D. For instance, after the peak of the first interference wave (the interference wave detected in correspondence to the front surface of the electrode plate Tu of the upper electrode 350) attributable to the interference of the light having traveled through the optical path pattern A appears, the peaks of the first interference waves corresponding to the interference of the light having traveled through the optical path pattern B and the optical path pattern C appear with an offset corresponding to the distance $M_1$ traveled by the reference mirror 240. The peak of the first interference wave corresponding to the interference of the light having traveled in the optical path pattern D appears with an offset corresponding to the distance $M_2$ traveled by the reference mirror 240, after the peak of the first interference wave manifested by the light having traveled through the optical path pattern A is detected. The first interference wave attributable to the interference of the light having traveled in the optical path pattern A appears the earliest since the optical path pattern A has the smallest optical path length, whereas the first interference waves corresponding to the optical path patterns B, C and D with greater optical path lengths than that of the optical path pattern A appear with offsets corresponding to the differences in the optical path length. It is to be noted that the first interference waves attributable to the interference of the light having traveled through the optical path patterns B and C with optical path lengths equal to each other appear simultaneously.

The extents by which the offsets of the interference of the light having passed through the optical paths A through D can be adjusted by adjusting the optical path lengths of the optical paths A through D through an adjustment of the optical path length (e.g., the length of the optical fiber e) at the measurement light detour optical path. Thus, by adjusting the optical path length (e.g., the length of the optical fiber e) of the measurement light detour optical path in a specific manner, the interference waveforms attributable to the measurement beams reflected from the individual measurement targets such as the electrode plate Tu of the upper electrode 350 and the wafer Tw and the reference light can be measured in close proximity to each other. As a result, the reference mirror 240 only needs to travel over the range in which the interference waveforms attributable to the measurement beams reflected from the measurement targets such as the electrode plate Tu of the upper electrode 350 and the wafer Tw and the reference light can be at least measured. Since the traveling distance of the reference mirror can be thus reduced, the length of time required for the temperature measurement, too, can be reduced.

In this case, by adjusting the optical path length of the measurement light detour optical path so as to measure the interference waveforms corresponding to the individual measurement targets such as the electrode plate Tu of the upper electrode 350 and the wafer Tw with the intervals of the peaks in the interference waveforms overlapping one another in their entirety or in part, the traveling distance of the reference mirror 240 can be further reduced, which, in turn, further reduces the length of time required for the temperature measurement.

In the temperature measuring system shown in FIG. 7, as the stepping motor 242 drives the reference mirror 240 for a scanning operation along one direction, the interference waves that are offset in correspondence to the varying optical path lengths of the optical paths A through D are obtained as described above. The optical path length of the measurement light detour optical path can be adjusted so as to overlap the entire peak interval Lw between the peaks in the interference waveforms corresponding to the wafer Tw with the peak interval between the peaks in the interference waveforms corresponding to the electrode plate Tu of the upper electrode 350 as shown in FIG. 9, for instance. In such a case, the reference mirror 240 only needs to travel over the distance in which the peak interval Lu between the peaks in the interference waveforms corresponding to the electrode plate Tu of the upper electrode 350 can at least be measured (e.g., over the range N in FIG. 9 to measure the peak interval Lw between the peaks in the interference waveforms corresponding to the wafer Tw as well as the peak interval Lu between the peaks in the interference waveforms corresponding to the electrode plate Tu of the upper electrode 350. As a result, the traveling distance of the reference mirror 240 is reduced, which, in turn, reduces the length of time required for the temperature measurement.

While an explanation is given above in reference to the third embodiment on an example in which the temperatures at two measurement targets $T_1$ and $T_2$, e.g., the electrode plate Tu at the upper electrode 350 and the wafer Tw, are measured, the present invention is not limited to this example and it may be adopted in temperature measurement for three or more measurement targets. While the reference mirror 240 would need to travel over a greater distance when the gaps (the distances) between the individual measurement targets $T_1$ through Tn are greater, the traveling distance of the reference mirror 240 can be significantly reduced by adjusting the optical path length of the measurement light detour optical path so as to overlap the peak intervals between the interference waves that need to be detected to measure the temperatures of the individual measurement targets $T_1$ through Tn. In such a case, the length of time required for the temperature measurement, too, can be greatly reduced. The temperature measuring system may include a greater number of detour optical paths in correspondence to the number n of the measurement targets $T_1$ through Tn.

In addition, the peak intervals between the interference waveforms that need to be detected for the measurement of the temperatures at the various measurement targets $T_1$ through Tn may only partially overlap instead of overlapping in their entirety. In addition, the peak intervals between the interference waveforms that need to be detected to measure the temperatures at the measurement targets $T_1$ through Tn do not need to overlap and instead they may be parallel to each other in close proximity.

(Variation of Temperature Measuring System Achieved in Third Embodiment)

Figure 10:
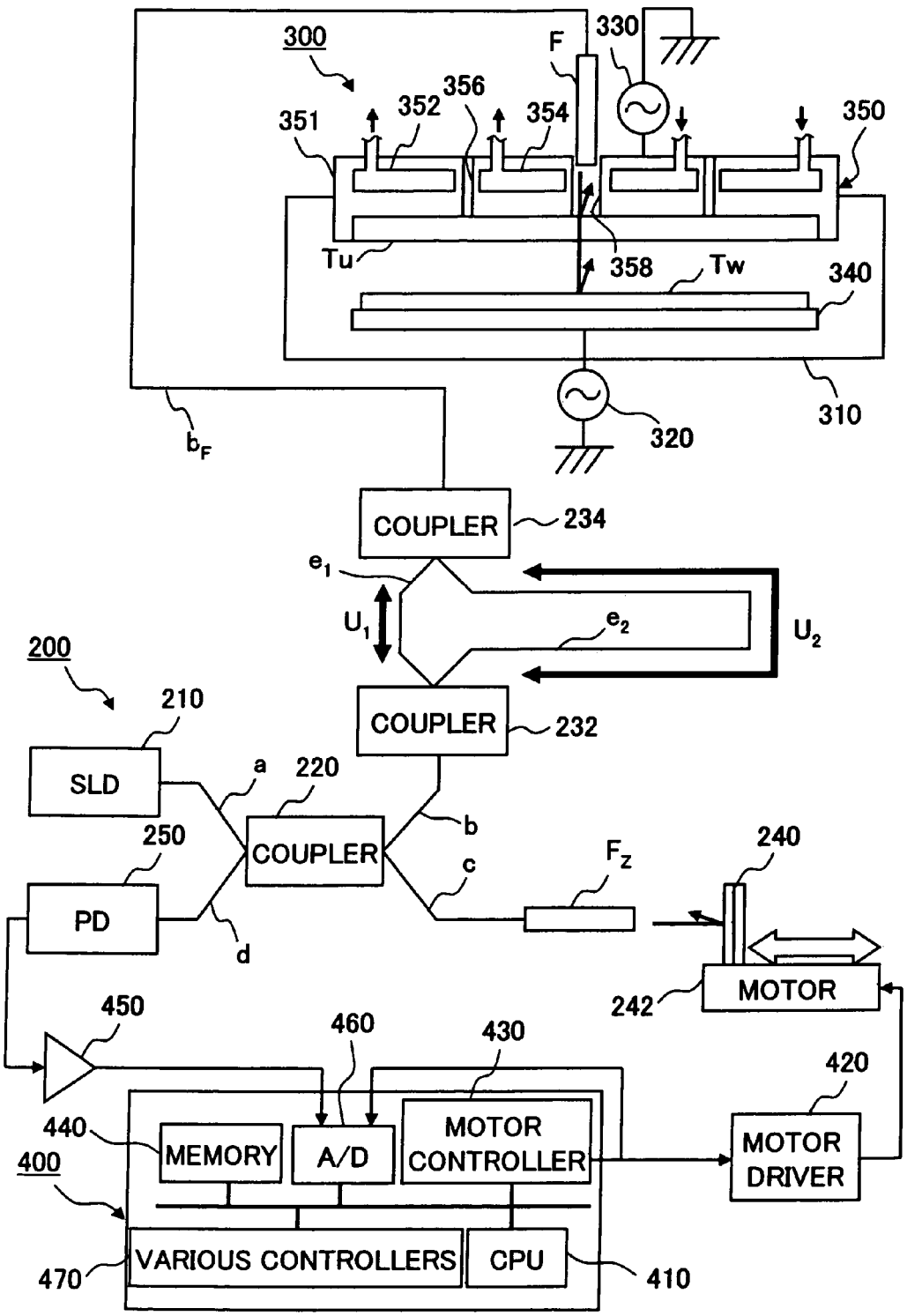
FIG. 10 is a schematic block diagram of the structure adopted in a variation of the temperature measuring system for a substrate processing apparatus achieved in the embodiment.

Next, a variation of the temperature measuring system achieved in the third embodiment is explained in reference to a drawing. FIG. 10 is a schematic block diagram of the structure adopted in a variation of the temperature measuring system in the third embodiment. The temperature measuring system shown in FIG. 10, which is substantially similar to that in FIG. 7, is characterized in that a loop is formed by connecting in parallel an optical fiber $e_1$ constituting the measurement light optical path and an optical fiber $e_2$ constituting a detour optical path with two detour optical path connection splitters (e.g., a 1×2 optical fiber coupler 232 and a 2×1 optical fiber coupler 234) as shown in FIG. 10, instead of forming a loop by connecting the optical fiber e constituting the detour optical path to the measurement light optical path with a single optical fiber coupler 230 as shown in FIG. 7. Thus, the temperature measuring system in FIG. 10 adopting the alternative structure, too, includes a detour optical path connected in parallel to the middle of the measurement light optical path constituting the measurement light transmitting means as in the case of the temperature measuring system shown in FIG. 7.

To explain the temperature measuring system in more specific terms, one of the output terminals (output ports) from the optical fiber coupler 220 is connected via an optical fiber b with an input terminal (input port) of the 1×2 optical fiber coupler 232 in FIG. 10. One end of the shorter optical fiber $e_1$ forming a path $U_1$ and one end of the optical fiber $e_2$ longer than the optical fiber $e_1$ and forming a path $U_2$ in the detour optical path are each connected to one of the two output terminals (output ports) of the 1×2 optical fiber coupler 232. The other ends of the optical fiber $e_1$ and the optical fiber $e_2$ are each connected to one of the two input terminals (input ports) of the 2×1 optical fiber coupler 234. The optical fiber F equipped with a collimator mounted at the front end of an optical fiber $b_F$ is connected to an output terminal (output port) of the 2×1 optical fiber coupler 234.

Through the measurement light transmitting means adopting the structure shown in FIG. 10, the measurement light having exited one of the output terminals (output ports) of the optical fiber coupler 220 is split into two beams at the optical fiber coupler 232 to be directed to the two output terminals (output ports) thereof. The measurement beam directed to one of the output terminals (output ports) then travels through the shorter optical fiber $e_1$ and enters the input terminal (input port) of the optical fiber coupler 234. The measurement beam to the other output terminal (output port) at the optical fiber coupler 232 then travels through the optical fiber $e_2$ constituting the detour optical path and enters the input terminal (input port) of the optical fiber coupler 234. At the optical fiber coupler 234, the measurement beams from the optical fiber $e_1$ and the optical fiber $e_2$ are combined and the combined measurement light is radiated from the front tip of the optical fiber F equipped with a collimator toward the electrode plate Tu of the upper electrode 350 and the wafer Tw.

It is to be noted that the relationships between the various patterns of measurement light optical paths (optical paths A through D) achieved with the measurement light transmitting means structured as shown in FIG. 10 and the corresponding measurement light paths are similar to those shown in FIG. 8 and the interference of the measurement beams having traveled in the optical paths A through D and the reference light occurs in a manner similar to that shown in FIG. 9. Namely, the extent of the offsets manifesting with regard to the interference waves attributable to the measurement beams having traveled through the individual optical paths A through D and the reference light can be adjusted in the temperature measuring system structured as shown in FIG. 10 as well by adjusting the optical path lengths of the optical paths A through D through an adjustment of the optical path lengths of the measurement light detour optical path (e.g., the lengths of the optical fibers $e_1$ and $e_2$).

Thus, by adjusting the optical path length (e.g., the lengths of the optical fibers $e_1$ and $e_2$) of the measurement light detour optical path in a specific manner, the interference waveforms of the interference manifested by the measurement beams and the reference light corresponding to the individual measurement targets such as the electrode plate Tu in the upper electrode 350 and the wafer Tw can be measured in close proximity to each other or to be measured with the peak intervals between the interference waveforms overlapping with one another in their entirety or in part. As a result, the reference mirror 240 only needs to travel over the range in which the interference waveforms attributable to the measurement beams and the reference light corresponding to the measurement targets such as the electrode plate Tu of the upper electrode 350 and the wafer Tw can be at least measured. Since the traveling distance of the reference mirror can be thus reduced, the length of time required for the temperature measurement, too, can be reduced.

With the optical fiber e used to constitute the detour optical path in FIG. 7 explained earlier, a loop is formed by connecting the other input terminal (input port) with the other output terminal (output port) within a single optical fiber coupler 230 and thus, it is necessary to bend the optical fiber e. This means that certain restrictions may apply with regard to the length or the thickness of the optical fiber e. For instance, a short or thick optical fiber, which cannot be bent with ease, is not suitable. In contrast, the optical fiber $e_2$ constituting the detour optical path shown in FIG. 10, which is connected between the two optical fiber couplers 232 and 234, does not need to be bent to a significant degree. For this reason, more flexibility is afforded with regard to the length and the thickness of the optical fiber.

In addition, while the measurement light optical path length is adjusted by adjusting the length of the optical fiber e constituting the detour optical path in FIG. 7, the length of the measurement light optical path itself can be adjusted in correspondence to the length of the optical fiber $e_1$ as well as the length of the optical fiber $e_2$ constituting the detour optical path and thus, the optical path lengths of the measurement beam optical paths A through D can be fine-adjusted with ease in the structure shown in FIG. 10.

(Measuring System Achieved in Fourth Embodiment)

Next, the temperature measuring system for a substrate processing apparatus achieved in the fourth embodiment is explained in reference to drawings. The temperature measuring system in the fourth embodiment, which is achieved by modifying the temperature adjustment system in the second embodiment, facilitates adjustment of optical axes of the measurement beams relative to the individual measurement targets, irrespective of the precision of the parallelism achieved with regard to the measurement targets.

Namely, in the temperature measuring system achieved in the second embodiment, the measurement light obtained by splitting the light from the SLD 110 is radiated via a single optical fiber F equipped with a collimator and the measurement beams reflected from the electrode plate Tu of the upper electrode 350 and the wafer Tw are detected. For this reason, depending upon the precision of the parallelism achieved with regard to the electrode plate Tu of the upper electrode 350 and the wafer Tw, the measurement beam optical axis adjustment may become a laborious process.

This issue is addressed in the temperature measuring system achieved in the fourth embodiment. It is improved over the temperature measuring system in the second embodiment in that the measurement light obtained by splitting the light originating from the light source is further split into measurement beams, the number of which matches the number of measurement targets and these measurement beams are radiated toward the individual measurement targets. The structure allows the optical axes of the various measurement beams to be adjusted in correspondence to the individual measurement targets and thus facilitates the measurement beam optical axis adjustment irrespective of the precision of the parallelism achieved for the measurement targets.

Figure 11:
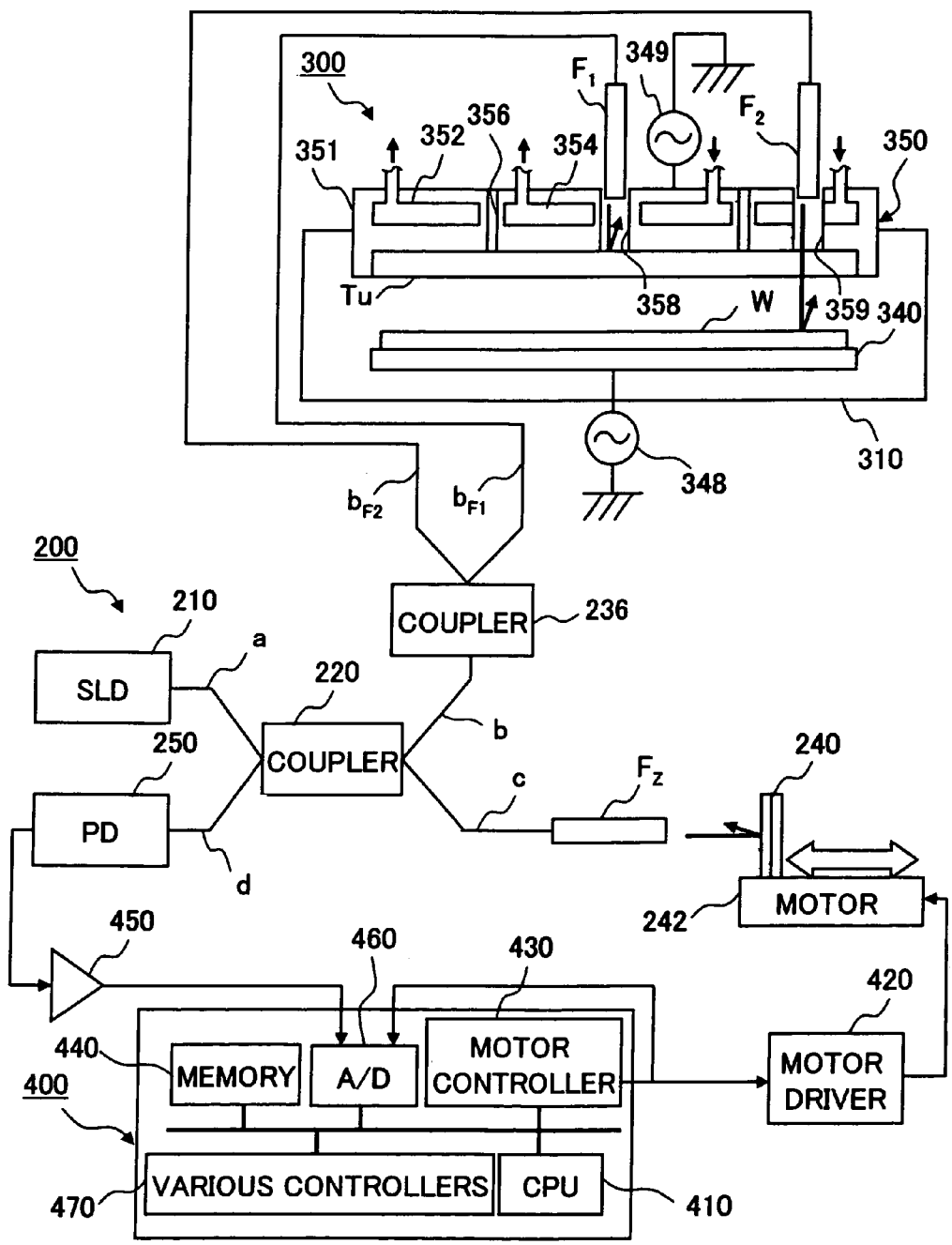
FIG. 11 is a schematic block diagram of the structure adopted in a specific example of the temperature measuring system for a substrate processing apparatus achieved in a fourth embodiment of the present invention.

FIG. 11 presents a specific example of a structure that may be adopted in the temperature measuring system in the fourth embodiment. In the temperature measuring system in FIG. 11, the measurement light obtained by splitting the light originating from the SLD 210 at a light source-side splitter such as a 2×2 optical fiber coupler 220 is further split at a measurement light splitter such as a 1×2 optical fiber coupler 236 into a first measurement beam and a second measurement beam. The first measurement beam is utilized to measure the temperature at the electrode plate Tu of the upper electrode 350, whereas the second measurement beam is used to measure the temperature at the wafer Tw.

To explain the structure of this temperature measuring system in further detail, one of the output terminals (output ports) from the optical fiber coupler 220 is connected via an optical fiber b with one of the input terminals (input ports) at the optical fiber coupler 236. An optical fiber $F_1$ equipped with a collimator mounted at the front tip of an optical fiber $b_{F1}$ and an optical fiber $F_2$ equipped with a collimator mounted at the front tip of an optical fiber $b_{F2}$ are each connected to one of the two output terminals (output ports) of the optical fiber coupler 236.

The optical fiber $F_1$ equipped with a collimator is disposed so that the first measurement beam is radiated toward the electrode plate Tu via a through hole 358 formed at the center of the electrode support member 351 at the upper electrode 350. In addition, the optical fiber $F_2$ equipped with a collimator is disposed so that the second measurement beam having been radiated toward the electrode plate Tu via a through hole 359 formed at an end of the electrode support member 351 of the upper electrode 350 and transmitted through the electrode plate Tu is then radiated toward the wafer Tw.

By further splitting the measurement light having been obtained by splitting the light originating from the SLD 210 into the first measurement beam used to measure the temperature at the electrode plate Tu of the upper electrode 350 and the second measurement beam used to measure the temperature at the wafer Tw and radiating these measurement beams through the front tips of the optical fibers $F_1$ and $F_2$ each equipped with a collimator as described above, the optical axis of the optical fiber $F_1$ equipped with a collimator and the optical axis of the optical fiber $F_2$ equipped with a collimator can be adjusted independently of each other. As a result, the optical axes of the corresponding measurement beams, too, can be adjusted with ease, irrespective of the precision of the parallelism achieved with regard to the electrode plate Tu of the upper electrode 350 and the wafer Tw. Consequently, the optical fibers each equipped with a collimator can be installed more easily, which reduces the labor required when installing the temperature measuring apparatus 200.

In addition, since the measurement light obtained by splitting the light originating from the SLD 210 is further split into the first measurement beam to travel through an optical path E via the optical fiber $F_1$ equipped with a collimator and the second measurement beam to travel through an optical path F via the optical fiber $F_2$ equipped with a collimator, instances of the interference attributable to two different types of measurement beams and the reference light can be measured.

Figure 12:
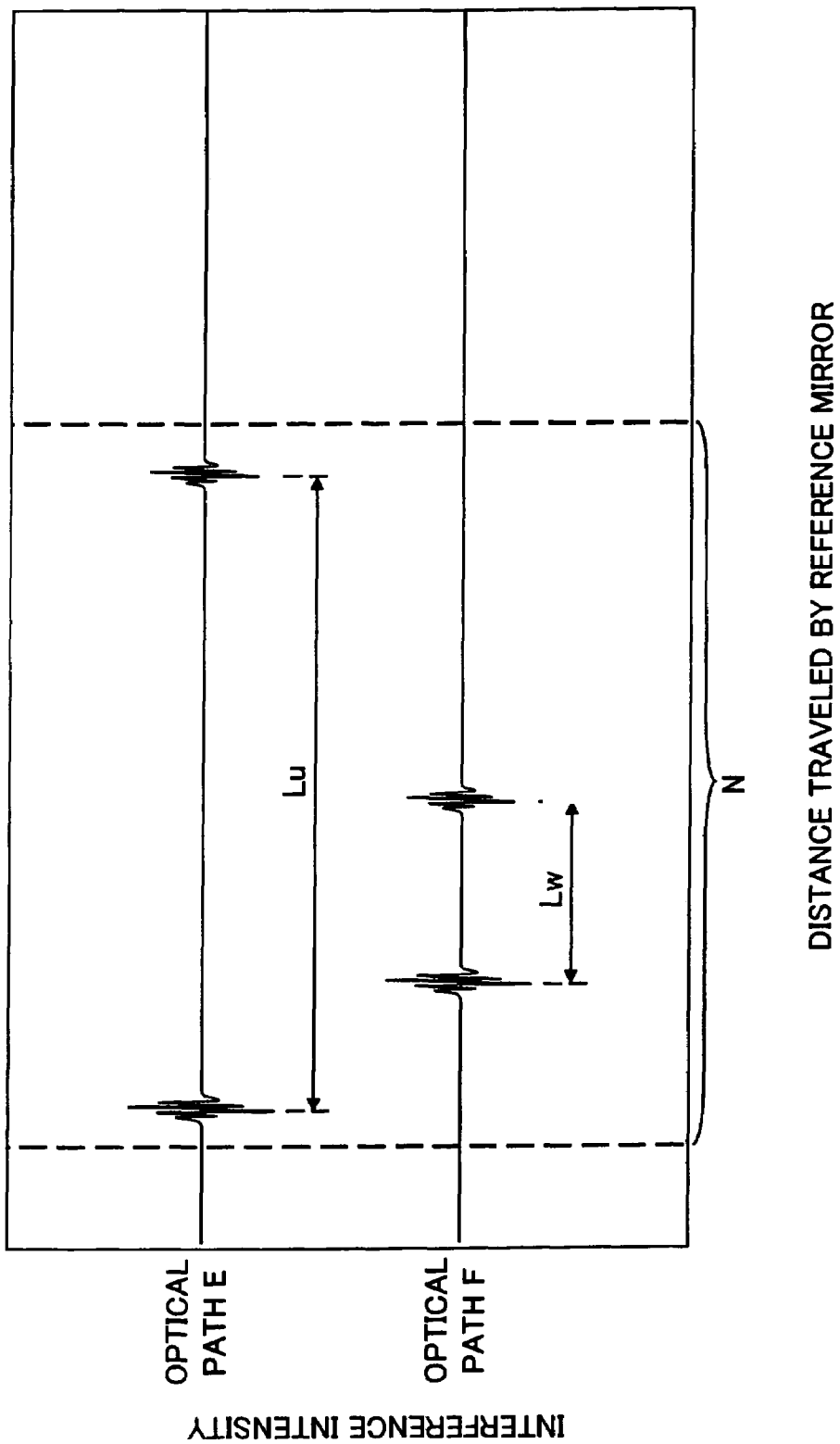
FIG. 12 presents a specific example of interference waves induced by measurement light and reference light in the temperature measuring apparatus achieved in the embodiment.

FIG. 12 shows the interference waveforms of the interference manifested by the measurement beams having traveled through the optical path patterns E and F and the reference light. FIG. 12 shows the interference waveforms obtained by scanning the reference mirror along a single direction just once. The distance over which the reference mirror is made to travel is indicated along the horizontal axis whereas the interference intensity is indicated along the vertical axis. It is to be noted that while FIG. 12 shows the interference waveforms corresponding to the individual optical path patterns E and F without overlapping them so as to ensure that the individual instances of interference can easily be distinguished, composite waveforms in which the light interference waveforms corresponding to the optical path patterns E and F are all integrated are actually measured.

The extent of the offset of the interference waves corresponding to the different optical path patterns E and F can be adjusted by adjusting the optical path lengths of the optical paths E and F corresponding to the first and second measurement beams through an adjustment of, for instance, the lengths of the optical fibers $b_{F1}$ and $b_{F2}$ constituting the optical fibers $F_1$ and $F_2$ each equipped with a collimator. By adjusting the optical path lengths of the optical paths E and F corresponding to the first and second measurement beams as described above, the interference waveforms attributable to the measurement beams reflected at the different measurement targets such as the electrode plate Tu of the upper electrode 350 and the wafer Tw and the reference light can be measured in close proximity to each other. As a result, the reference mirror 240 only needs to travel over the range in which the interference waveforms attributable to the measurement beams reflected from the measurement targets such as the electrode plate Tu of the upper electrode 350 and the wafer Tw and the reference light can be at least measured. Since the traveling distance of the reference mirror can be thus reduced, the length of time required for the temperature measurement, too, can be reduced.

The optical path lengths of the measurement light optical paths E and F corresponding to the first and second measurement beams can be adjusted so as to overlap the entire peak interval Lw between the peaks in the interference waveforms corresponding to the wafer Tw with the peak interval between the peaks in the interference waveforms corresponding to be electrode plate Tu of the upper electrode 350 as shown in FIG. 12, for instance. In such a case, the reference mirror 240 only needs to travel over the distance in which the peak interval Lu between the peaks in the interference waveforms corresponding to the electrode plate Tu of the upper electrode 350 can be measured (e.g., over the range N in FIG. 12 to measure the peak interval Lw between the interference peaks in the waveforms corresponding to the wafer Tw as well as the peak interval Lu between the peaks in the interference waveforms corresponding to the electrode plate Tu of the upper electrode 350. As a result, the traveling distance of the reference mirror 240 is reduced, which, in turn, reduces the length of time required for the temperature measurement.

It is to be noted that if the optical path lengths of the optical paths E and F corresponding to the first and second measurement beams are set equal to each other, the first and second measurement beams travel through the optical paths from the optical fiber coupler 236 to the electrode plate Tu of the upper electrode 350, extending over equal distances and, as a result, interference waves attributable to these measurement beams and the reference light are similar to those shown in FIG. 6. In this case, the temperatures can be determined by measuring the interference waveforms attributable to the measurement beams and the reference light, as in the method corresponding to FIG. 6.

In addition, the optical path lengths of the first and second measurement beams may be adjusted by offsetting the positions at which the front tips of the collimators of the optical fibers $F_1$ and $F_2$ equipped with collimators are set, instead of altering the lengths of the optical fibers $b_{F1}$ and $b_{F2}$ constituting the optical fibers $F_1$ and $F_2$ equipped with the collimators as described earlier.

While an explanation is given above in reference to the fourth embodiment on an example in which the temperatures at two measurement targets $T_1$ and $T_2$, e.g., the electrode plate Tu at the upper electrode 350 and the wafer Tw, are measured, the present invention is not limited to this example and it may be adopted in temperature measurement for three or more measurement targets. When measuring the temperatures at three or more measurement targets, the measurement light obtained by splitting the light originating from the SLD 210 may be split into first through nth measurement beams at a splitter (e.g., a 1×n optical fiber coupler), the number of which matches the number n of the measurement targets $T_1$ through Tn and these first through nth measurement beams may be radiated toward the measurement targets $T_1$ through Tn so as to be transmitted through the individual measurement targets $T_1$ through Tn, starting at the measurement target ($T_1$ or Tn) disposed at an outermost end position. This structure, too, facilitates the adjustment of the optical axes of the various measurement beams, first through nth measurement beams, irrespective of the precision of the parallelism achieved for the measurement targets $T_1$ through Tn.

While the reference mirror 240 would need to travel over a greater distance when the gaps (the distances) between the individual measurement targets $T_1$ through Tn are greater, the traveling distance of the reference mirror 240 can be reduced by adjusting the optical path lengths of the first through nth measurement beams so as to overlap the peak intervals between the interference waves that need to be detected to measure the temperatures of the individual measurement targets $T_1$ through Tn. In such a case, the length of time required for the temperature measurement, too, can be greatly reduced.

In addition, the peak intervals between the interference waveforms that need to be detected for the measurement of the temperatures at the various measurement targets $T_1$ through Tn may only partially overlap instead of overlapping in their entirety. In addition, the peak intervals between the interference waveforms that need to be detected to measure the temperatures at the measurement targets $T_1$ through Tn do not need to overlap and instead they may be parallel to each other in close proximity.

(Temperature Measuring System Achieved in Fifth Embodiment)

Next, the temperature measuring system for a substrate processing apparatus achieved in the fifth embodiment is explained in reference to drawings. The temperature measuring system in the fifth embodiment, achieved by modifying the temperature measuring system in the second embodiment, allows the traveling distance of the reference mirror to be further reduced. While the optical path length of the measurement light is adjusted in the third and fourth embodiments described earlier, the optical path length of the reference light is adjusted in the fifth embodiment.

Figure 13:
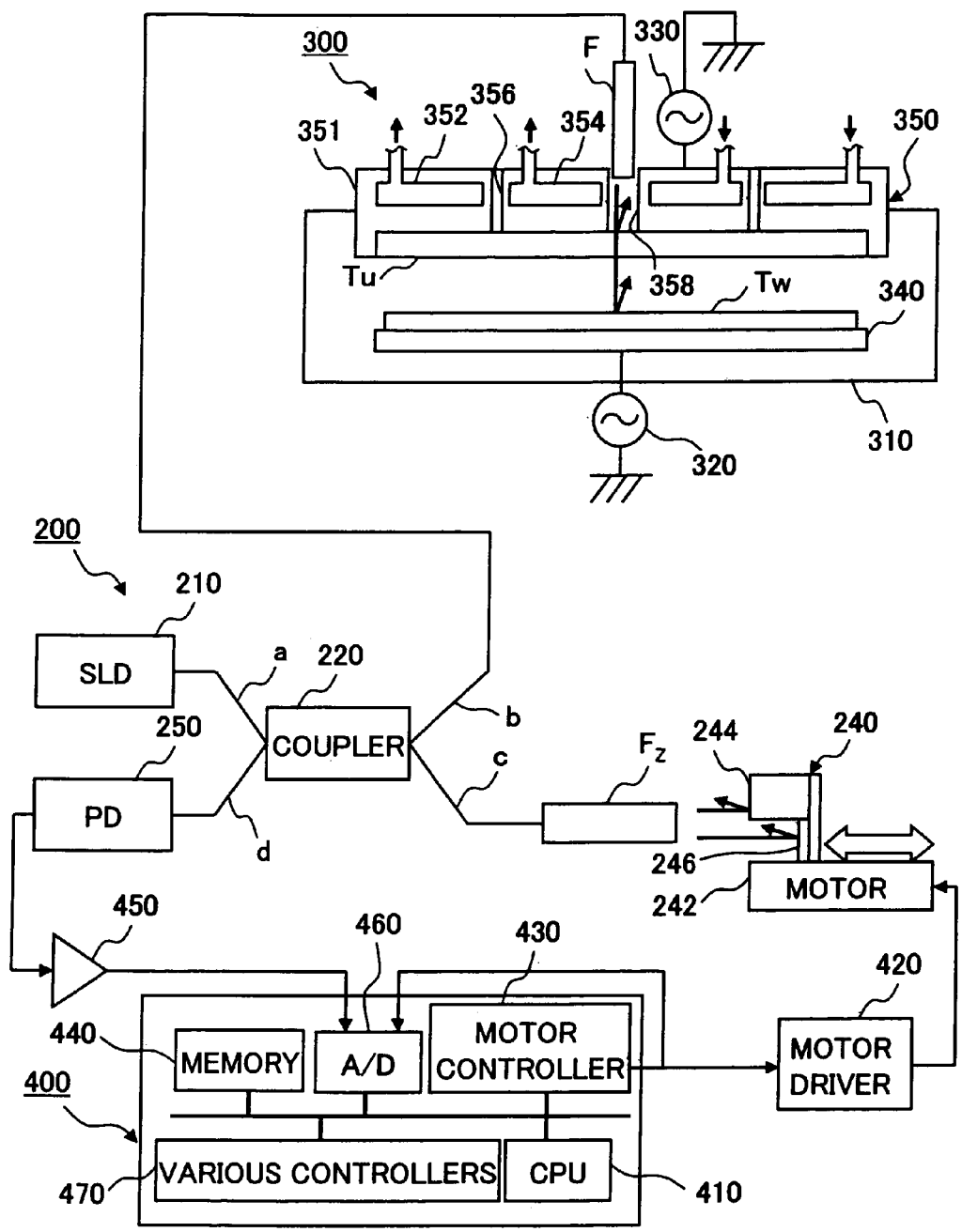
FIG. 13 is a schematic block diagram of the structure adopted in a specific example of the temperature measuring system for a substrate processing apparatus achieved in a fifth embodiment of the present invention.

An example of a structure that may be adopted in the temperature measuring system in the fifth embodiment is presented in FIG. 13. The temperature measuring system in FIG. 13 includes a reference mirror 240 constituted with a first reference mirror 244 and a second reference mirror 246 having reflecting surfaces set at different positions. An optical fiber $F_Z$ equipped with a collimator is disposed at a reference light radiation position at which the reference light from the reference light transmitting means such as the optical fiber $F_Z$ equipped with a collimator is radiated toward both the first reference mirror 244 and the second reference mirror 246 and reference beams reflected from the individual reference mirrors 244 and 246 are received at the same optical fiber $F_Z$ equipped with a collimator.

In the temperature measuring system structured as described above, as the first and second reference mirrors 244 and 246 are driven together by the stepping motor 242, the reference light having been obtained by splitting the light originating from the SLD 210 and radiated from the optical fiber $F_Z$ equipped with a collimator is reflected at the reference mirror 240 as separate reference beams, i.e., the first reference beam reflected at the first reference mirror 244 to travel through an optical path G and the second reference beam reflected at the second reference mirror 246 to travel through an optical path H, and thus, interference waves attributable to the measurement light and two different reference beams can be measured.

Figure 14:
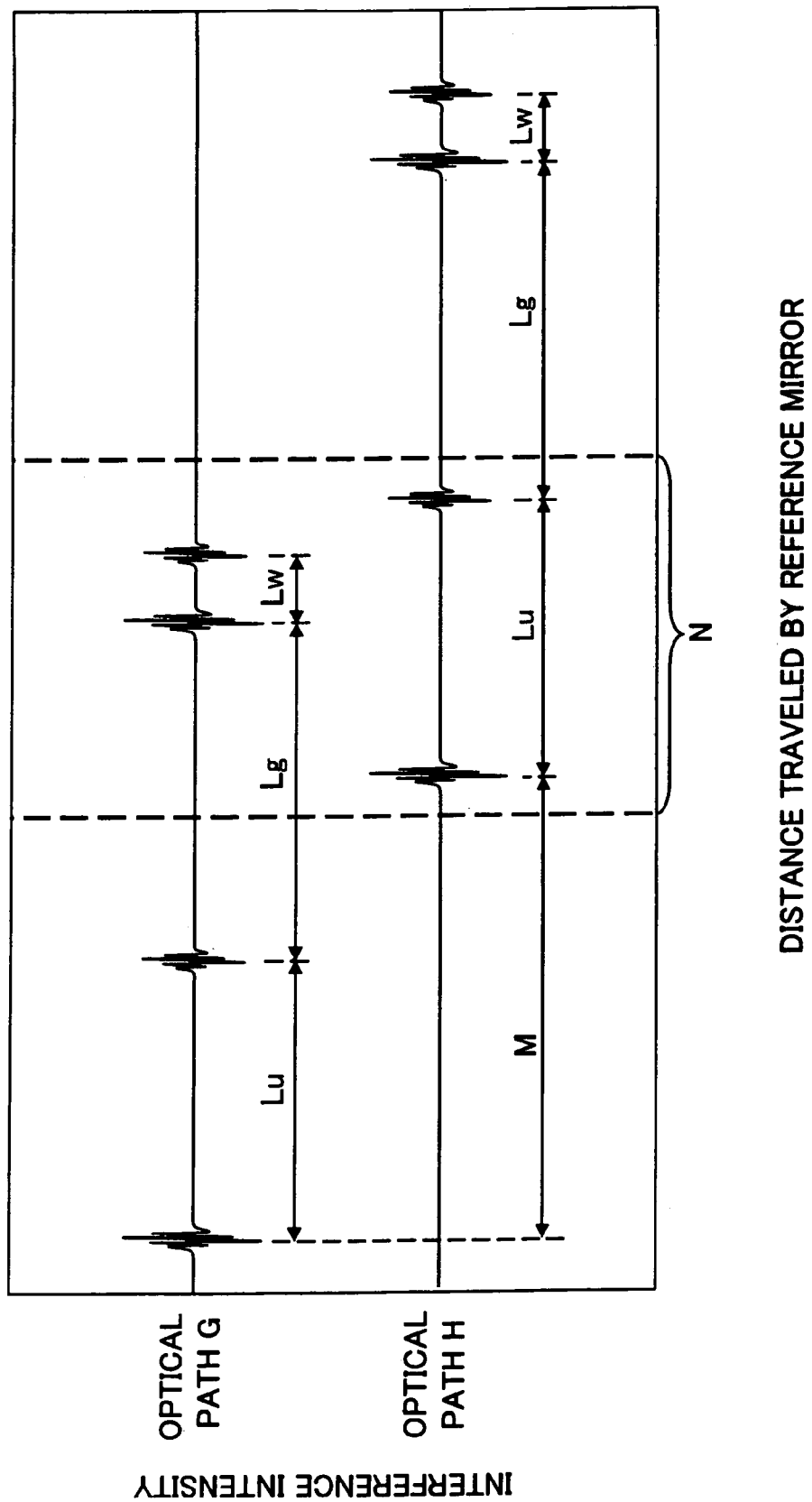
FIG. 14 presents a specific example of interference waves induced by measurement light and reference light in the temperature measuring apparatus achieved in the embodiment.

FIG. 14 shows the interference waveforms of the interference attributable to the measurement light and the reference beams having travelled through the optical paths G and H. FIG. 14 shows the interference waveforms obtained by scanning the reference mirror 240 provided as an integrated unit of the first and second reference mirrors 244 and 246 along a single direction just once. The distance over which the reference mirror 240 is made to travel is indicated along the horizontal axis whereas the interference intensity is indicated along the vertical axis. It is to be noted that while FIG. 14 shows the interference waveforms corresponding to the individual optical paths G and H without overlapping them so as to ensure that the individual instances of interference can easily be distinguished, composite waveforms in which the light interference waveforms corresponding to the optical paths G and H are all integrated are actually measured.

As shown in FIG. 14, the interference of the light corresponding to each of the optical path patterns G and H invariably manifests as the interference waveforms detected in correspondence to the front surface and the rear surface of the electrode plate Tu of the upper electrode 350 and the interference waves detected in correspondence to the front surface and the rear surface of the wafer Tw with peak intervals Lu, Lg and Lw as in the interference of light shown in FIG. 6. This means that similar measurement results are obtained in correspondence to the interference of the reference light having traveled through either of the optical path patterns G and H.

The extent of the offset of the interference waves corresponding to the different optical path patterns G and H can be adjusted by adjusting the optical path lengths of the optical paths G and H corresponding to the first and second reference beams through an adjustment of the extent to which the reflecting surfaces of the reference mirrors 244 and 246 are offset from each other. By adjusting the optical path lengths of the optical paths G and H corresponding to the first and second reference beams as described above, the interference waveforms attributable to the measurement light reflected at the different measurement targets such as the electrode plate Tu of the upper electrode 350 and the wafer Tw and the reference beams can be measured in close proximity to each other. As a result, the reference mirror 240 only needs to travel over the range in which the interference waveforms attributable to the measurement light reflected from the measurement targets such as the electrode plate Tu of the upper electrode 350 and the wafer Tw and the reference beams can be at least measured. Since the traveling distance of the reference mirror can be thus reduced, the length of time required for the temperature measurement, too, can be reduced.

The optical path lengths of the first and second reference beam optical paths G and H can be adjusted so as to, for instance, overlap the entire peak interval Lw between the peaks in the interference waveforms corresponding to the wafer Tw with the peak interval between the peaks in the interference waveforms corresponding to be electrode plate Tu of the upper electrode 350 as shown in FIG. 14. In such a case, the reference mirror 240 only needs to travel over the distance in which the peak interval Lu between the peaks in the interference waveforms corresponding to the electrode plate Tu of the upper electrode 350 can at least be measured (e.g., over the range N in FIG. 14 to measure the peak interval Lw between the peaks in the interference waveforms corresponding to the wafer Tw as well as the peak interval Lu between the peaks in the interference waveforms corresponding to the electrode plate Tu of the upper electrode 350. As a result, the traveling distance of the reference mirror 240 is reduced, which, in turn, reduces the length of time required for the temperature measurement.

While an explanation is given above in reference to the fifth embodiment on an example in which the temperatures at two measurement targets $T_1$ and $T_2$, e.g., the electrode plate Tu at the upper electrode 350 and the wafer Tw, are measured, the present invention is not limited to this example and it may be adopted in temperature measurement for three or more measurement targets. When measuring the temperatures at three or more measurement targets, the reference mirror 240 should include first through nth reference mirrors having reflecting surfaces set at different positions, the number of which matches the number n of the measurement targets $T_1$ through Tn, so that the reference light is radiated onto all the reference mirrors, the first through nth reference mirrors, to obtain first through nth reference beams reflected from the respective reference mirrors, i.e., the first through nth reference mirrors.

While the reference mirror 240 would need to travel over a greater distance when the gaps (the distances) between the individual measurement targets $T_1$ through Tn are greater, the traveling distance of the reference mirror 240 can be reduced by adjusting the optical path lengths of the first through nth reference beams so as to overlap the peak intervals between the interference waves that need to be detected to measure the temperatures of the individual measurement targets $T_1$ through Tn and, in such a case, the length of time required for the temperature measurement, too, can be greatly reduced.

The peak intervals between the interference waves that need to be detected for the measurement of the temperatures at the various measurement targets $T_1$ through Tn may only partially overlap instead of overlapping in their entirety. In addition, the peak intervals between the interference waveforms that need to be detected to measure the temperatures at the measurement targets $T_1$ through Tn do not need to overlap and instead they may be parallel to each other in close proximity.

(Variation of Temperature Measuring System Achieved in Fifth Embodiment)

Figure 15:
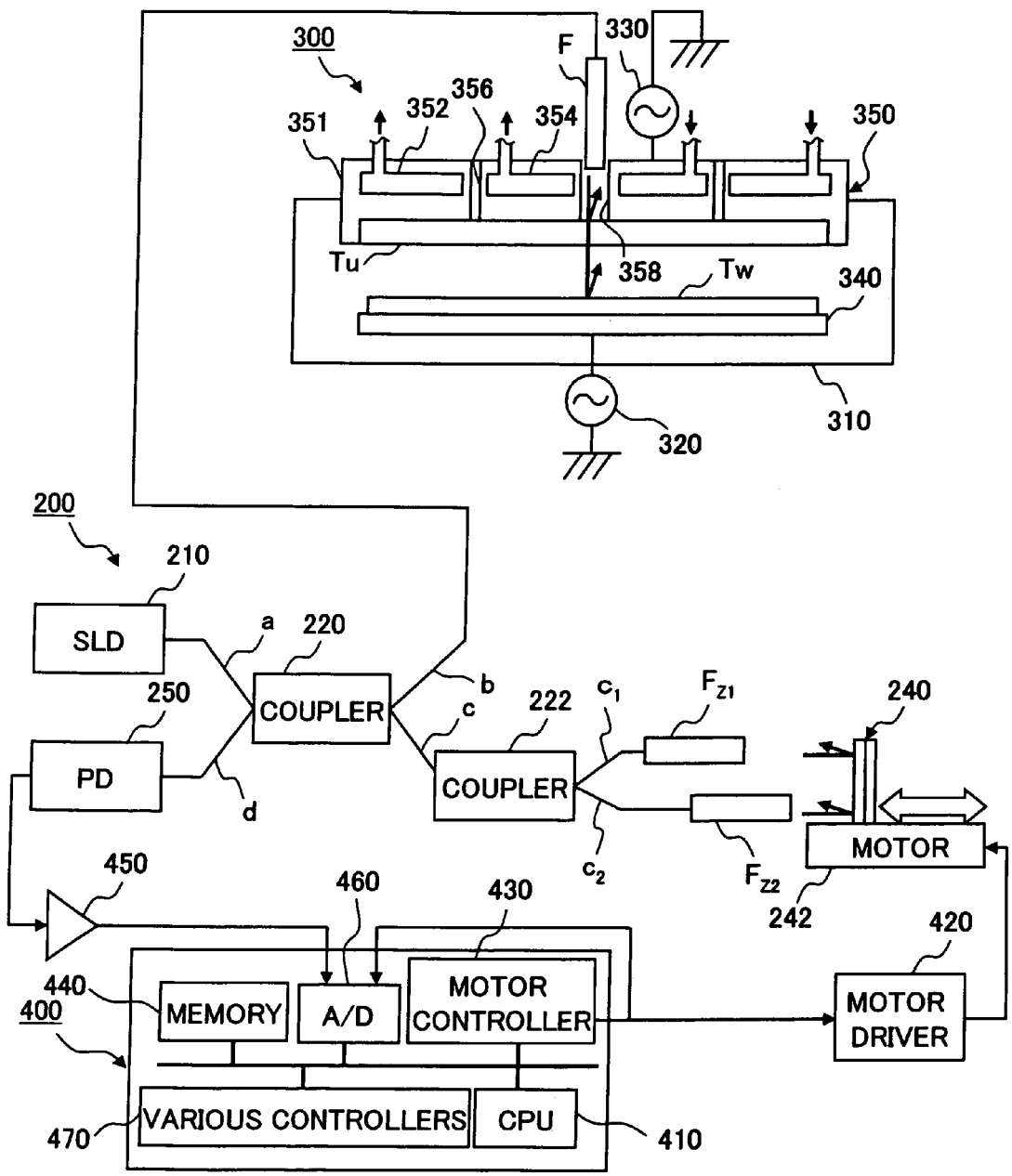
FIG. 15 is a schematic block diagram of the structure adopted in a variation of the temperature measuring system for a substrate processing apparatus achieved in the embodiment.

Next, a variation of the temperature measuring system achieved in the fifth embodiment is explained in reference to a drawing. FIG. 15 is a schematic block diagram of the structure adopted in a variation of the temperature measuring system in the fifth embodiment. The temperature measuring system shown in FIG. 15, which is substantially similar to that in FIG. 13, is characterized in that after the light originating from the SLD is first split into measurement light and reference light at the light source-side splitter such as the 2×2 optical fiber coupler 220, the reference light is further split into a first reference beam and a second reference beam at a reference light splitter which may be constituted with a 1×2 optical fiber coupler 222 and that the optical path lengths of the first and second reference beams are adjusted by adopting a structure in which the first and second reference beams are radiated onto the reference mirror 240 and the reflected reference beams from the reference mirror 240 are detected, instead of adjusting the optical path lengths of the first and second reference beams by offsetting the reflecting surfaces of the reference mirrors, as shown in FIG. 13.

To explain the temperature measuring system in more specific terms, one of the output terminals (output ports) from the optical fiber coupler 220 is connected via an optical fiber c with an input terminal (input port) of the 1×2 optical fiber coupler 222 in FIG. 15. An optical fiber $F_{Z1}$ equipped with a collimator mounted at the front tip of an optical fiber $c_{Z1}$ and an optical fiber $F_{Z2}$ equipped with a collimator mounted at the front tip of an optical fiber $c_{Z2}$ are each connected to one of the two output terminals (output ports) at the 1×2 optical fiber coupler 222.

Through the reference light transmitting means adopting the structure shown in FIG. 15, the reference light having exited the other output terminal (output port) of the optical fiber coupler 220 is split into two beams at the optical fiber coupler 222 to be directed to the two output terminals (output ports) thereof. The first reference beam directed to one of the output terminals (output ports) is radiated toward the reference mirror 240 through the optical path G which extends via the optical fiber $F_{Z1}$ equipped with a collimator, whereas the second reference beam directed to the other output terminal (output port) is radiated toward the reference mirror 240 through the optical path H which extends via the optical fiber $F_{Z2}$ equipped with a collimator.

It is to be noted that interference waves attributable to the reference beams transmitted through the reference light transmitting means structured as shown in FIG. 15 and the measurement light are similar to those shown in FIG. 14. Namely, the extent of the offset M of the interference waves corresponding to the different optical paths G and H can be adjusted by adjusting the optical path lengths of the optical paths G and H corresponding to the first and second reference beams through an adjustment of, for instance, the lengths of the optical fibers $c_{Z1}$ and $c_{Z2}$ constituting the optical fibers $F_{Z1}$ and $F_{Z2}$ each equipped with a collimator in the temperature measuring system structured as shown in FIG. 15, as well.

Thus, by adjusting the optical path lengths of the first and second reference beams (e.g., the lengths of the optical fibers $c_{Z1}$ and $c_{Z2}$) in a specific manner, interference waveforms attributable to the measurement light reflected from the individual measurement targets such as the electrode plate Tu of the upper electrode 350 and the wafer Tw and the reference beams can be measured in close proximity to each other or to be measured with the peak intervals between the interference waveforms overlapping with one another in their entirety or in part. As a result, the reference mirror 240 only needs to travel over the range in which the interference waveforms attributable to the measurement light reflected from the measurement targets such as the electrode plate Tu of the upper electrode 350 and the wafer Tw and the reference beams can be at least measured. Since the traveling distance of the reference mirror can be thus reduced, the length of time required for the temperature measurement, too, can be reduced.

(Other Variations of the Temperature Measuring System Achieved in the Fifth Embodiment)

Next, in reference to the drawings, other variations of the temperature measuring system achieved in the fifth embodiment are explained. While a detour optical path connected in parallel to the measurement light optical path constituting the measurement light transmitting means is included in the middle of the measurement light optical path in the third embodiment explained earlier, a detour optical path connected in parallel in the middle of the reference light optical path constituting the reference light transmitting means is included in the other variations of the fifth embodiment.

In such an alternative structure, too, both the reference beam having traveled through the detour optical path and the reference beam that has not passed through the detour optical path are both radiated toward the reference mirror 240 and, as a result, a greater number of interference patterns attributable to the measurement light and the reference light are achieved, as in the third embodiment. By adjusting the extent of the offset manifesting between the interference waves through an adjustment of the optical path length of the detour optical path, the interference waveforms needed for the measurement alone can be made to appear in close proximity to each other. As a result, the distance over which the reference mirror is required to travel can be further reduced.

Figure 16:
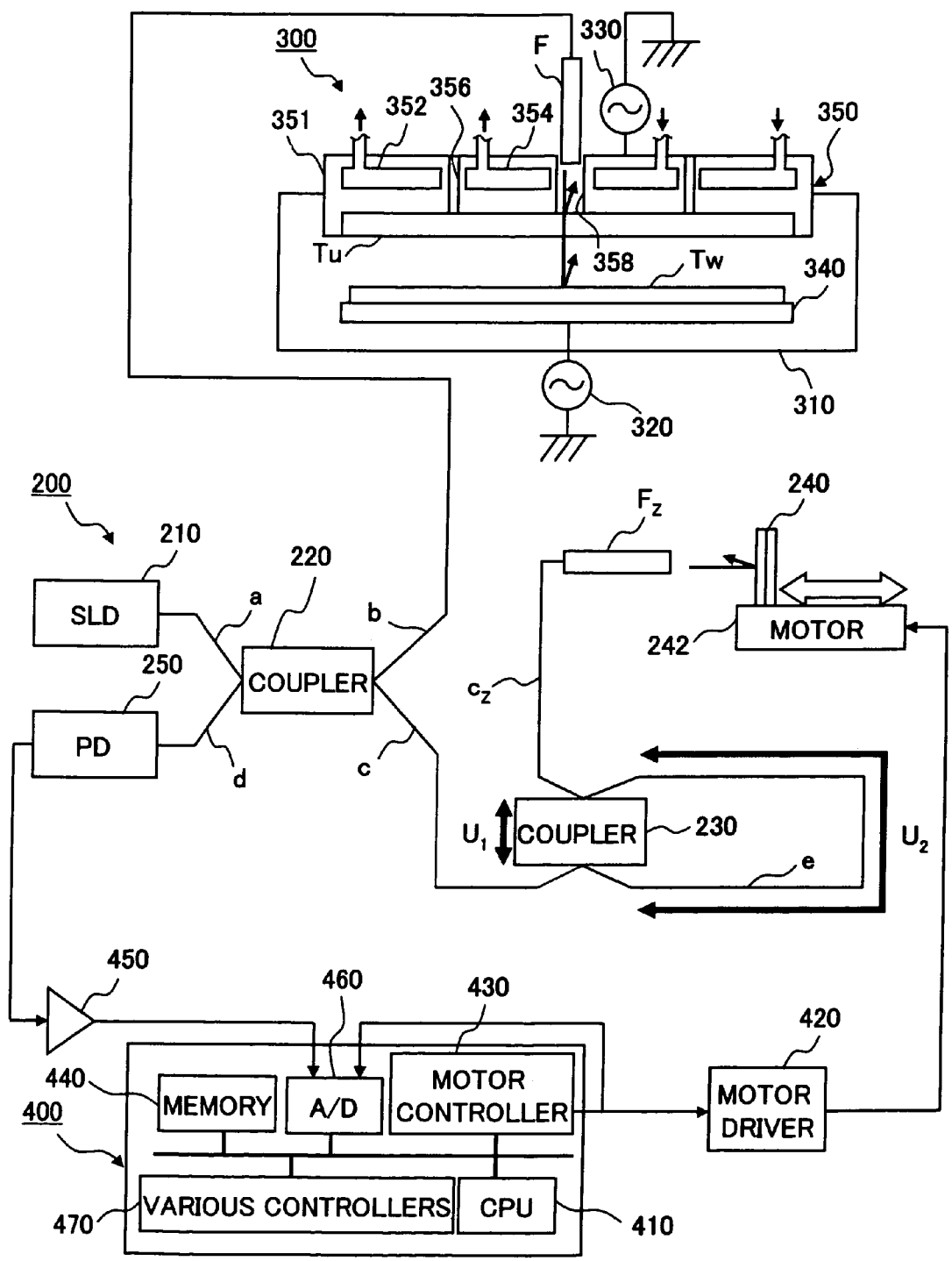
FIG. 16 is a schematic block diagram of the structure adopted in another variation of the temperature measuring system for a substrate processing apparatus achieved in the embodiment.
Figure 17:
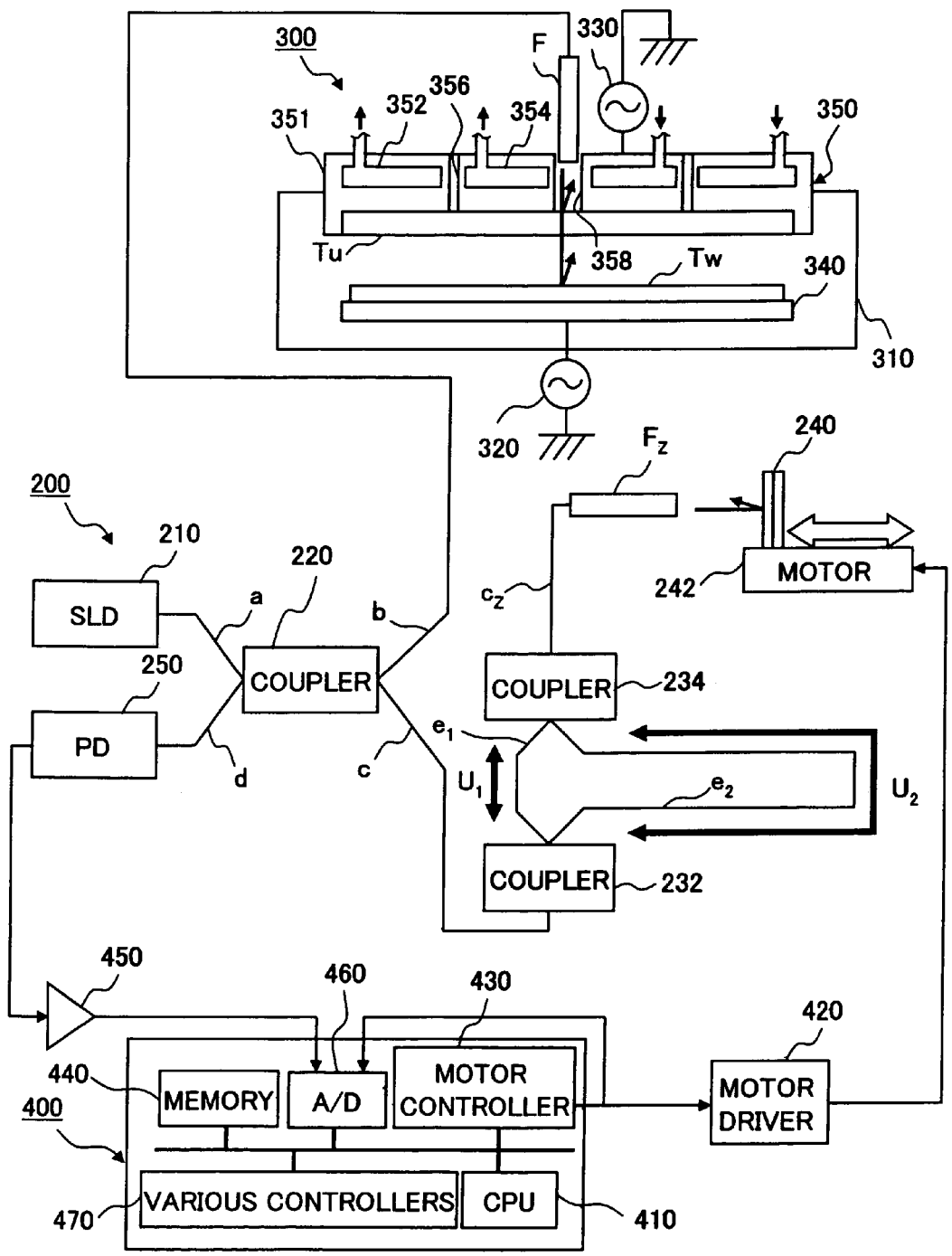
FIG. 17 is a schematic block diagram of the structure adopted in yet another variation of the temperature measuring system for a substrate processing apparatus achieved in the embodiment.

Specific examples of structures that may be adopted in the variations of the temperature measuring system achieved in the fifth embodiment are presented in FIGS. 16 and 17. In the temperature measuring system shown in FIG. 16, a detour optical path is connected in a manner similar to that shown in FIG. 7. Namely, the reference light transmitting means of the temperature measuring system in FIG. 16 includes a detour optical path connection splitter such as a 2×2 optical fiber coupler 230 to be used to connect in parallel an optical fiber e to constitute a detour optical path in the middle of the reference light optical path extending from the optical fiber coupler 220.

To explain the structure adopted in the temperature measuring system in FIG. 16 in further detail, the other output terminal (output port) from the optical fiber coupler 220 is connected via the optical fiber c to one of the input terminals (input ports) at the optical fiber coupler 230. One of the output terminals (output ports) at the optical fiber coupler 230 is connected with an optical fiber $F_Z$ equipped with a collimator mounted at the front tip of an optical fiber $c_Z$. In addition, the other input terminal (input port) and the other output terminal (output port) at the optical fiber coupler 230, connected with the optical fiber e constituting the detour optical path, forms a loop.

At the reference light transmitting means structured as shown in FIG. 16, the reference light exiting the other output terminal (output port) from the optical fiber coupler 220 is split into two beams which are then directed to two separate output terminals (output ports) at the optical fiber coupler 230. The reference beam directed to one of the output terminals (output ports) is radiated through the optical fiber $c_Z$ toward the reference mirror 240 from the front tip of the optical fiber $F_Z$ equipped with a collimator. The reference beam directed to the other output terminal (output port) at the optical fiber coupler 230 is reverted via the optical fiber e to the other input terminal (input port) at the optical fiber coupler 230 and is further split into two beams which are directed to the two separate output terminals (output ports) at the optical fiber coupler 230. The reference beam directed to one of the output terminals (output ports) is radiated through the optical fiber $c_Z$ toward the reference mirror 240 from the front tip of the optical fiber $F_Z$ equipped with a collimator.

The temperature measuring system shown in FIG. 17 represents an example in which a detour optical path is connected in a manner similar to that shown in FIG. 10. Namely, a loop is formed by connecting in parallel an optical fiber $e_1$ to constitute a reference light optical path and an optical fiber $e_2$ to constitute a detour optical path with two detour optical path connection splitters (e.g., a 1×2 optical fiber coupler 232 and a 2×1 optical fiber coupler 234. In the temperature measuring system shown in FIG. 17, too, a detour optical path connected in parallel in the middle of the reference light optical path constituting the reference light transmitting means can be formed as in the structure shown in FIG. 16.

To explain the temperature measuring system in more specific terms, the other output terminal (output port) from the optical fiber coupler 220 is connected via the optical fiber c with an input terminal (input port) of the 1×2 optical fiber coupler 232 in FIG. 17. One end of the shorter optical fiber $e_1$ forming a path $U_1$ and one end of the optical fiber $e_2$ longer than the optical fiber $e_1$ and forming a path $U_2$ in the detour optical path are each connected to one of the two output terminals (output ports) of the 1×2 optical fiber coupler 232. The other end of the optical fiber $e_1$ and the optical fiber $e_2$ are each connected to one of the two input terminals (input ports) at the 2×1 optical fiber coupler 234. An optical fiber $F_Z$ equipped with a collimator mounted at the front end of an optical fiber $c_Z$ is connected to an output terminal (output port) of the 2×1 optical fiber coupler 234.

Through the reference light transmitting means adopting the structure shown in FIG. 17, the reference light having exited the other output terminal (output port) of the optical fiber coupler 220 is split into two beams at the optical fiber coupler 232 to be directed to the two output terminals (output ports) thereof. The reference beam directed to one of the output terminals (output ports) then travels through the shorter optical fiber $e_1$ and enters the input terminal (input port) of the optical fiber coupler 234. The reference beam directed to the other output terminal (output port) at the optical fiber coupler 232 then travels through the optical fiber $e_2$ constituting the detour optical path and enters the input terminal (input port) of the optical fiber coupler 234. At the optical fiber coupler 234, the reference beams from the optical fiber $e_1$ and the optical fiber $e_2$ are combined and the combined reference light is radiated from the front tip of the optical fiber $F_Z$ equipped with a collimator toward the reference mirror 240.

The relationships between the various patterns of reference light optical paths (optical paths A through D) achieved with the reference light transmitting means structured as shown in FIG. 16 or FIG. 17 and the corresponding reference light paths are similar to those shown in FIG. 8 and the interference of the reference beams having traveled in the optical paths A through D and the measurement light occurs in a manner similar to that shown in FIG. 9. Namely, the extent of the offset manifesting with regard to the interference waves attributable to the measurement light and the reference beams having traveled through the individual optical paths A through D can be adjusted in the temperature measuring system structured as shown in FIG. 16 or FIG. 17 as well by adjusting the optical path lengths of the optical paths A through D through an adjustment of the optical path length of the reference light detour optical path (e.g., the length of the optical fiber e or the lengths of the optical fibers $e_1$ and $e_2$).

Thus, by adjusting the optical path length (e.g., the length of the optical fiber e or the lengths of the optical fibers $e_1$ and $e_2$) of the reference light detour optical path in a specific manner, the interference waveforms attributable to the measurement light reflected from the individual measurement targets such as the electrode plate Tu of the upper electrode 350 and the wafer Tw and the reference beams can be measured in close proximity to each other or to be measured with the peak intervals between the interference waveforms overlapping with one another in their entirety or in part. As a result, the reference mirror 240 only needs to travel over the range in which the interference waveforms attributable to the measurement light reflected from the measurement targets such as the electrode plate Tu of the upper electrode 350 and the wafer Tw and the reference beams can be at least measured. Since the traveling distance of the reference mirror can be thus reduced, the length of time required for the temperature measurement, too, can be reduced.

(Temperature Measuring System That Does Not Include Optical Fibers or the Like)

Figure 18:
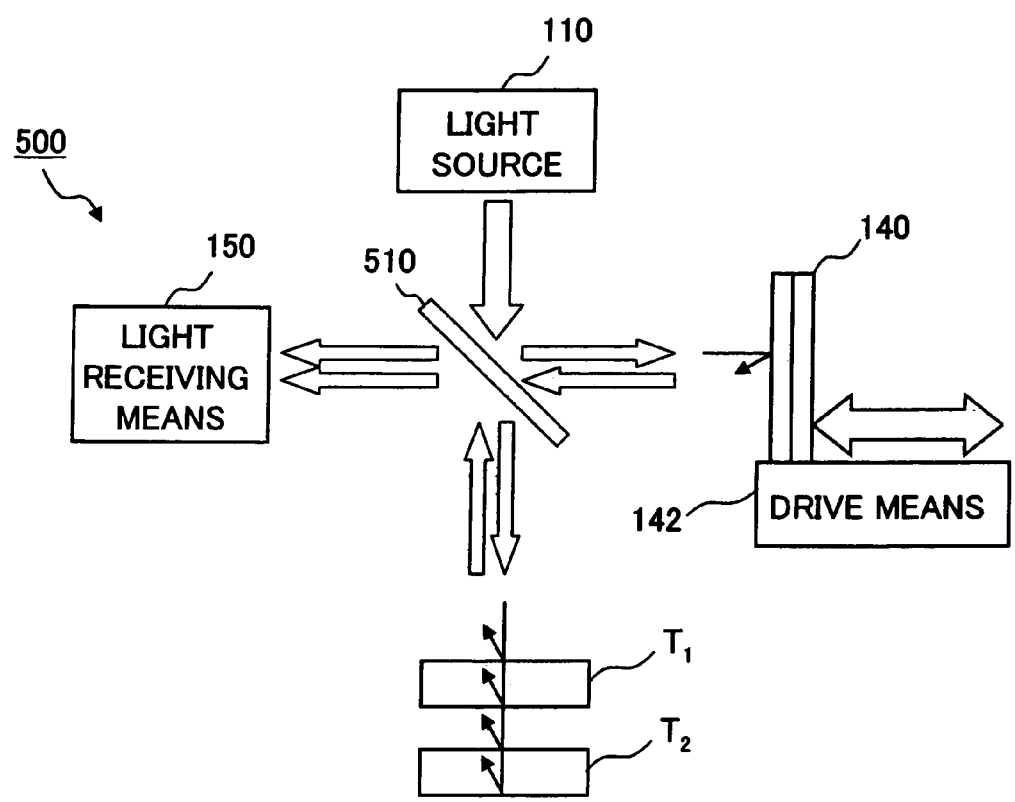
FIG. 18 illustrates the principle adopted in a temperature measuring apparatus in which light beams including measurement light and reference light are transmitted through air.

It is to be noted that while an explanation is given above in reference to the temperature measuring systems achieved in the third through fifth embodiments on examples in which optical fibers are utilized as the measurement light transmitting means and the reference light transmitting means and the measurement light and the reference light used for the temperature measurement are transmitted through these optical fibers, the present invention is not limited to these examples and beams such as the measurement light and the reference light to be used for the temperature measurement may instead be transmitted through air based upon the principle illustrated in FIG. 18, without using any optical fibers or collimate fibers.

FIG. 18 illustrates the principle adopted in a temperature measuring apparatus 500 in which light is transmitted through the air without using any optical fibers or collimate fibers. In the temperature measuring apparatus 500, light originating from a light source (e.g., SLD) 110 is transmitted through the air and is radiated onto a splitter (e.g. half mirror) 510 where it is split into reference light and measurement light. The measurement light is transmitted through the air and is radiated toward measurement targets $T_1$ and $T_2$ facing opposite each other where it is reflected at the front surfaces and the rear surfaces thereof. The reference light is transmitted through the air, is radiated toward a reference light reflecting means (e.g., reference mirror) 140 and is reflected at the front surface of the mirror constituting the reference light reflecting means. The reflected measurement light and the reflected reference light are transmitted through the air, reenter the splitter 510 and are received at a light receiving means 150. During this process, depending upon the optical path length of the reference light, the measurement light and the reference light become overlapped on each other, thereby inducing interference and the interference waves attributable to this interference are detected at the light receiving means 150. By adopting this principle, light can be transmitted without using any optical fibers or collimate fibers. In this case, a light source 110 that emits light with a wavelength (e.g., a wavelength equal to or greater than 2.5 μm) which does not allow the light to pass through optical fibers or collimate fibers can be utilized as the source of the measurement light and the reference light.

(Control System for Substrate Processing Apparatus)

In addition, by adding various controllers 470 including a controller that controls the temperatures at, for instance, the electrode plate Tu of the upper electrode 350 and the wafer Tw in any of the temperature measuring systems in the third through fifth embodiments described above, a control system for a substrate processing apparatus that controls the temperatures of the electrode plate Tu of the upper electrode 350 and the wafer Tw with the various controllers 470 based upon the results of the temperature measurement executed by the temperature measuring apparatus 200 can be achieved.

In such a case, the various controllers may include, for instance, an inner coolant controller and an outer coolant controller that control the temperature of the electrode plate Tu of the upper electrode 350. The inner coolant controller controls the temperature at the inner side of the upper electrode 350 by controlling the temperature or the flow rate of the coolant circulated through an inner coolant flow passage 354. The outer coolant controller controls the temperature at the outer side of the upper electrode 350 by controlling the temperature or the flow rate of the coolant circulated through an outer coolant flow passage 352.

In addition, the various controllers 470 may include an ESC (electrostatic chuck) parameter controller and an FR (focus ring) parameter controller that control the temperature at the wafer Tw. The ESC parameter controller controls the voltage applied to the electrostatic chuck (ESC) (not shown) which electrostatically holds the wafer at the lower electrode 340, the gas flow rate or the gas pressure of the backside gas supplied to the wafer Tw via the electrostatic chuck, the temperature of the coolant circulated through the coolant flow passage formed within the lower electrode 340 and the like. The FR parameter controller controls the voltage applied to a circumferential ring such as a focus ring disposed so as to surround the wafer, the gas flow rate or the gas pressure of the backside gas supplied to the wafer Tw via the focus ring and the like.

By providing any of the temperature measuring systems achieved in the third through fifth embodiments as a control system for a substrate processing apparatus as described above, the temperature at the upper electrode 350 and the temperature at the wafer Tw can be controlled, which enables accurate control of the process characteristics of the wafer TW and improves the stability of the substrate processing apparatus.

(Thickness Measuring Apparatus and Thickness Measuring System)

In addition, while an explanation is given above in reference to the first through fifth embodiments on an example in which the temperatures of measurement targets are measured, the present invention is not limited to this example and it may instead be adopted when measuring the thicknesses of measurement targets. Namely, in the first through fifth embodiments, based upon the principle that the interval between the peaks in the interference waveforms attributable to the measurement light reflected at the front surface and the rear surface of a measurement target and the reference light is equivalent to the optical path length corresponding to the measurement target, the optical path length at the measurement target is determined by measuring the peak interval between the interference waveforms as the distance traveled by the reference light reflecting means (e.g., reference mirror) and the optical path length thus determined is converted to a value representing the temperature at the measurement target.

At the same time, the optical path length L is expressed as the product, thickness d×refractive index n, which is dependent upon the temperature, and accordingly, once the refractive index n at the temperature at which the optical path length L is measured is ascertained, the thickness d of the measurement target can be calculated by dividing the measured optical path length L by the refractive index n. Thus, the relationship between the temperature and the refractive index n at the measurement target may be stored in advance as thickness reference conversion data in the memory 440 or the like at the control device 400 and the thickness d of the measurement target may be calculated by measuring the temperature at which the optical path length L at the measurement target is measured with a separate temperature measuring means (such as a resistance thermometer or fluorescence thermometer), determining the refractive index n corresponding to the temperature based upon the thickness reference conversion data and then dividing the optical path length L by the refractive index n.

Since the thickness of a measurement target can be calculated by using the interference waveforms attributable to the measurement light and the reference light as described above, the principle may be applied to provide the temperature measuring apparatus and the temperature measuring system for a substrate processing apparatus achieved in any of the first through fifth embodiments as a thickness measuring apparatus and a thickness measuring system for a substrate processing apparatus. By measuring the thickness of a consumable part such as the electrode plate Tu of the upper electrode 350 in the substrate processing apparatus 300 on a regular basis, the extent of loss of the consumable part such as the electrode plate Tu can be measured. This, in turn, makes it possible to assess the correct timing with which the electrode plate Tu should be replaced.

It is to be noted that the thickness measurement may be always executed at a given temperature, such as when the power to the substrate processing apparatus 300 is turned on or after maintenance work on the substrate processing apparatus 300 is completed and the refractive index n corresponding to the temperature may be stored into the memory 440 at the control device 400 or the like. In such case, it is not necessary to measure the temperature of the measurement target each time the thickness needs to be calculated, which eliminates the need for the separate temperature measuring means and minimizes the labor and the length of time required for the thickness measurement. It is to be noted that by allowing the controlled device 400 to function as a thickness calculating means or a control means, the thicknesses of various measurement targets can be determined by the control device 400 based upon the results of the measurement of interference attributable to the measurement light and the reference light.

In addition, the plurality of measurement targets to undergo temperature measurement or thickness measurement according to the present invention may be distanced from each other or may be in contact with each other, as long as they are set so as to face opposite each other. Also, the plurality of measurement targets may face opposite each other in their entirety or they may partially face opposite each other. If the plurality of measurement targets face opposite each other in part, the measurement light should be radiated toward the portions of the measurement targets that face opposite each other to enable the measurement of the temperatures or the thicknesses of the individual measurement targets.

(Intensity of Light from Light Source)

As has been explained in reference to the embodiments, the measurement light is radiated toward a plurality of measurement targets set so as to face opposite each other and the light transmitted through a given measurement target is used as the measurement light in the measurement for the next measurement target. For this reason, the intensity of such measurement light decreases as the measurement light is transmitted through the measurement targets $T_1$ through Tn and through the space between the individual measurement targets $T_1$ through Tn, which results in a lower level of intensity in the interference manifested by the measurement light and the reference light and a reduction in the light intensity (S/N ratio) relative to noise. The intensity of the measurement light tends to become markedly lower as the number n of measurement targets through which the measurement light is transmitted increases. In addition, the intensity of the measurement light tends to be lower at a measurement target further distanced from the measurement light radiation position. For instance, the light intensity of the measurement light reflected from the first measurement target among the plurality of measurement targets set so as to face opposite each other is the greatest and the level of intensity of measurement light reflected from the second and subsequent measurement targets gradually decreases.

Since the intensity of the measurement light decreases as the measurement light is transmitted through the measurement targets and the space between the measurement targets as described above, the light intensity (S/N ratio) relative to the noise in the interference waveforms attributable to the measurement light and the reference light, too, decreases, which distorts the waveforms (e.g., the shapes of the interference waveforms further deviate from the Gauss distribution), which may result in reduced accuracy in the peak position detection. This, in turn, lowers the accuracy with which the temperatures are measured based on the peak intervals between the interference waveforms. It is to be noted that the term "noise" in this context refers to noise originating in the electronic circuit and noise occurring in the surrounding electromagnetic environment when the high-frequency power is applied to the upper electrode 350.

Accordingly, the temperature measuring apparatus 100 or 200 may include a light intensity adjusting means capable of adjusting the light intensity at the light source 110 such as the SLD 210 to alter the intensity of the light originating from the light source 110 measuring the interference of the measurement light and the reference light by controlling the light intensity adjusting means with the control device 400 via, for instance, a light intensity controller included as one of the various controllers.

With these measures, the intensity of the measurement light transmitted through the measurement targets $T_1$ through Tn and through the space between the individual measurement targets $T_1$ through Tn can be sustained at a desired level while measuring the interference of the measurement light and the reference light, so as to ensure that the interference waveforms attributable to the measurement light and the reference light can be kept intact without allowing the S/N ratio of the interference waveforms to become lowered and allowing the interference waveforms to become distorted. Consequently, an improvement is achieved in the accuracy with which the peak positions in the interference waveforms are detected, which, in turn, improves the accuracy of temperature or thickness measurement executed based upon the peak intervals between the peaks in the interference waveforms.

More specifically, the intensity of the light from the light source may be adjusted by, for instance, gradually increasing the light intensity at the light source in correspondence to the distance traveled by the reference light reflecting means (e.g. reference mirror) 140 while measuring the interference of the measurement light and the reference light. In this case, the light intensity can be increased to or greater extent for a measurement target further distanced from the measurement light radiation position so as to prevent a reduction in the S/N ratio in the interference waveforms attributable to the measurement light and the reference light corresponding to the measurement target.

Alternatively, the light intensity at the light source may be adjusted in correspondence to each of the measurement targets $T_1$ through Tn while measuring the interference of the measurement light and the reference light. Since the intensity of the measurement light changes from one measurement target to another among the measurement targets $T_1$ through Tn, the intensity of the measurement light can be sustained at a desired level with higher accuracy by adjusting the light intensity at the light source in correspondence to each of the measurement targets $T_1$ through Tn.

For instance, the levels of the intensity of the measurement light reflected from the individual measurement targets may be measured in advance and the light intensity at the light source may be altered in correspondence to the level of the intensity of the measurement light reflect from a given measurement target (e.g., the level of interference intensity manifesting in the interference waveforms attributable to the measurement light and the reference light) measured in advance when measuring the interference of the measurement light and the reference light corresponding to the particular measurement target. In this case, the light intensity at the light source can be increased to a greater extent if the level of the intensity of the reflected measurement light is lower, so as to effectively prevent the S/N ratio in the interference waveforms attributable to the measurement light and the reference light from becoming lowered.

In addition, the light intensity at the light source may be adjusted in correspondence to each of the measurement targets $T_1$ through Tn during the measurement of the interference attributable to the measurement light and the reference light so as to increase the light intensity to a greater extent in correspondence to a measurement target further distanced from the measurement light radiation position. When the number of measurement targets through which the measurement light is transmitted, i.e., the number of measurement targets present between the measurement target currently undergoing the measurement and the measurement light radiation position, is significant and thus the measurement light intensity decreases to a greater extent, the intensity of the light at the light source can be increased more to effectively prevent any reduction in the S/N ratio in the interference waveforms attributable to the measurement light and the reference light. For instance, when executing measurement at the electrode plate Tu of the upper electrode 350 and the wafer Tw at once, the light intensity at the light source should be raised for the measurement of the interference waves attributable to the measurement light and the reference light corresponding to the wafer Tw relative to the light intensity at the light source for the measurement of the interference waveforms attributable to the measurement light and the reference light corresponding to the electrode plate Tu of the upper electrode 350. Since this raises the intensity of the measurement light used in the measurement at the wafer Tw, the S/N ratio in the interference waveforms attributable to the measurement light and the reference light corresponding to the wafer Tw does not become lowered.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while an explanation is given above in reference to the embodiments on an example in which the substrate undergoing measurement is a wafer Tw processed inside the processing chamber 310 of the substrate processing apparatus 300, the present invention is not limited to this example and the substrate undergoing the measurement may be a liquid crystal substrate such as a glass substrate, instead.

In addition, while the electrode plate undergoing the measurement in the embodiments is the electrode plate Tu of the upper electrode 350 disposed inside the processing chamber 210 of the substrate processing apparatus 300, the electrode plate of the lower electrode 340 may undergo measurement, instead. Since the electrode plate of the lower electrode 340 is set facing opposite the electrode plate Tu of the upper electrode 350 as well as the substrate such as the wafer Tw, the temperatures or the thicknesses of the electrode plate Tu at the upper electrode 350, the wafer Tw and the electrode plate at the lower electrode 340 can be measured all at once by adopting any of the structures achieved in the embodiments.

Furthermore, the measurement targets do not need to be a wafer and an electrode plate disposed inside the substrate processing apparatus and as long as they are disposed so as to face opposite each other, the temperatures or the thicknesses of various components or members disposed within the substrate processing apparatus can be measured in a batch. For instance, the circumferential ring (e.g., a focus ring) disposed around the wafer, too, faces opposite the electrode plate and thus, the temperatures or the thicknesses of the circumferential ring and the electrode plate can be measured at once.

Moreover, while an explanation is given above in reference to the embodiments on an example in which the present invention is adopted in conjunction with a substrate processing apparatus which may be, for instance, a plasma processing apparatus, the present invention is not limited to this example and may be adopted with equal effectiveness in conjunction with various types of substrate processing apparatuses including a film forming apparatus that does not use plasma and a film reforming apparatus such as a heat treatment apparatus. In addition, the temperature/thickness measuring apparatus according to the present invention may be adopted in conjunction with any of various types of processing apparatuses as well as a substrate processing apparatus.

What is claimed is;

1. A temperature/thickness measuring apparatus that measures temperatures or the thicknesses of a plurality of measurement targets set so as to face opposite one another based upon interference of light, comprising:
    a light source that emits light with a wavelength that allows the light to be transmitted and reflected at said measurement targets;
    a splitter that splits the light from said light source to measurement light and reference light;
    a reference light reflecting means for reflecting said reference light from said splitter; an optical path length altering means for altering the optical path length of said reference light reflected by said reference light reflecting means;
    a reference light transmitting means for transmitting said reference light from said splitter to a reference light radiation position at which said reference light is radiated toward said reference light reflecting means;
    a measurement light transmitting means for transmitting said measurement light from said splitter to a measurement light radiation position at which said measurement light is radiated toward said plurality of measurement targets so as to be transmitted through said measurement targets; and
    a light receiving means for measuring interference of light manifested by measurement beams reflected from said measurement targets and said reference light reflected from said reference light reflecting means.

2. A temperature/thickness measuring apparatus according to claim 1, wherein:
    said measurement light transmitting means includes a detour optical path connected in parallel to a measurement light optical path in the middle of said measurement light optical path.

3. A temperature/thickness measuring apparatus according to claim 2, wherein:
    the length of said measurement light detour optical path is adjusted so that interference waveforms attributable to said measurement beams and said reference light corresponding to the individual measurement targets are measured in close proximity to one another.

4. A temperature/thickness measuring apparatus according to claim 3, wherein:
    the length of said measurement light detour optical path is adjusted so that interference waveforms attributable to said measurement beams and said reference light corresponding to the individual measurement targets are measured with peak intervals between said interference waveforms partially or entirely overlapping.

5. A temperature/thickness measuring apparatus according to claim 1, further comprising:
    a measurement light splitter provided between said splitter and said measurement light transmitting means that further splits said measurement light from said splitter.

6. A temperature/thickness measuring apparatus according to claim 1, wherein:
    said reference light reflecting means includes a plurality of reflecting surfaces at which said reference light from said splitter is reflected as a plurality of reference beams with varying optical path lengths.

7. A temperature/thickness measuring apparatus according to claim 6, wherein:
    the positions of said plurality of reflecting surfaces at said reference light reflecting means are adjusted so that interference waveforms attributable to said measurement beams and said reference beams corresponding to the individual measurement targets are measured in close proximity to one another.

8. A temperature/thickness measuring apparatus according to claim 7, wherein:
    the positions of said plurality of reflecting surfaces at said reference light reflecting means are adjusted so that interference waveforms attributable to said measurement beams and said reference beams corresponding to the individual measurement targets are measured with peak intervals between said interference waveforms partially or entirely overlapping.

9. A temperature/thickness measuring apparatus according to claim 1, further comprising:
    a reference light splitter that further splits said reference light from said splitter into a plurality of reference beams, wherein: said plurality of reference beams from said reference light splitter are radiated onto said reference light reflecting means.

10. A temperature/thickness measuring apparatus according to claim 9, wherein:
    the optical path lengths of said plurality of reference beams from said reference light splitter are adjusted so that interference waveforms attributable to said measurement beams and said reference beams corresponding to the individual measurement targets are measured in close proximity to one another.

11. A temperature/thickness measuring apparatus according to claim 10, wherein: the optical path lengths of said plurality of reference beams from said reference light splitter are adjusted so that interference waveforms attributable to said measurement beams and said reference beams corresponding to the individual measurement targets are measured with peak intervals between said interference waveforms partially or entirely overlapping.

12. A temperature/thickness measuring apparatus according to claim 1, wherein: said reference light transmitting means includes a detour optical path connected in parallel to a reference light optical path in the middle of said reference light optical path.

13. A temperature/thickness measuring apparatus according to claim 12, wherein: the length of said reference light detour optical path is adjusted so that interference waveforms attributable to said measurement beams and said reference light corresponding to the individual measurement targets are measured in close proximity to one another.

14. A temperature/thickness measuring apparatus according to claim 13, wherein: the length of said reference light detour optical path is adjusted so that interference waveforms attributable to said measurement beams and said reference light corresponding to the individual measurement targets are measured with peak intervals between said interference waveforms partially or entirely overlapping.

15. A temperature/thickness measuring apparatus according to claim 1, wherein the light emitted from the light source, the measurement light, the reference light, and the measurement beams are all transmitted through air.

16. A temperature/thickness measuring apparatus according to claim 1, wherein: said measurement targets are each constituted of a silicon film or a silicon oxide film; and said light source is capable of emitting light at a wavelength within a range of 1.0 to 2.5 µm.

17. A temperature/thickness measuring apparatus according to claim 16, wherein: said measurement targets are a substrate processed inside a substrate processing apparatus and an electrode plate set so as to face opposite the substrate.

18. A temperature/thickness measuring apparatus according to claim 16, wherein: said measurement targets are a circumferential ring disposed around a substrate undergoing processing inside a substrate processing apparatus and an electrode plate set so as to face opposite said circumferential ring.

19. A temperature/thickness measuring method for measuring temperatures or the thicknesses of a plurality of measurement targets set so as to face opposite one another based upon interference of light, comprising:
 a step in which measurement light and reference light obtained by splitting light from a light source that emits light with a wavelength allowing the light to be transmitted and reflected at said plurality of measurement targets are radiated respectively toward said measurement targets so as to be transmitted through said measurement targets and toward a reference light reflecting means;
 a step in which interference of light manifested by measurement beams reflected from said measurement targets and said reference light reflected from said reference light reflecting means is measured while altering the optical path length of said reference light reflected from said reference light reflecting means by scanning said reference light reflecting means along one direction; and
 a step in which the temperatures or the thicknesses of said measurement targets are measured based upon the results of the interference measurement.

20. A temperature/thickness measuring method according to claim 19, further comprising:
 connecting a detour optical path formed in the middle of a measurement light optical path in parallel to said measurement light optical path; and
 in said interference measuring step, measuring interference of light manifested by measurement light transmitted directly without traveling through said measurement light detour optical path and said reference light and interference manifested by measurement light having traveled through said measurement light detour optical path at least once and said reference light.

21. A temperature/thickness measuring method according to claim 19, further comprising:
 splitting said measurement light from said splitter; and
 in said interference measuring step, measuring interference of said measurement beams and reflected at said measurement targets and said reference light reflected from said reference light reflecting means.

22. A temperature/thickness measuring method according to claim 19, wherein:
 said reference light reflecting means includes a plurality of reflecting surfaces; and in said interference measuring step, measuring interference of light manifested by said reference light obtained by splitting the light from said light source and reflected at said reflecting surfaces as a plurality of reference beams and said measurement beams reflected from said measurement targets.

23. A temperature/thickness measuring method according to claim 19, further comprising:
 splitting said reference light output from said splitter into a plurality of reference beams; and
 in said interference measuring step, measuring interference of light manifested by said plurality of reference beams reflected at said reference light reflecting means and said measurement beams reflected from the individual measurement targets.

24. A temperature/thickness measuring method according to claim 19, further comprising:
 connecting a detour optical path formed in the middle of a reference light optical path in parallel to said reference light optical path, and
 in said interference measuring step, measuring interference of light manifested by reference light transmitted directly without traveling through said reference light optical path and said measurement beams, and measuring interference manifested by reference light that travels through said reference light detour optical path at least once and said measurement beams.

25. A temperature/thickness measuring method according to claim 19, wherein:
 the light emitted from the light source, the measurement light, the reference light, and the measurement beams are all transmitted through air.

26. A temperature/thickness measuring method according to claim 19, wherein:
 said measurement targets are each constituted with a silicon film or a silicon oxide film; and
 said light source is capable of emitting light at a wavelength within a range of 1.0 to 2.5 µm.

27. A temperature/thickness measuring method according to claim 26, wherein:
 said measurement targets are a substrate processed inside a substrate processing apparatus and an electrode plate set so as to face opposite said substrate.

28. A temperature/thickness measuring method according to claim 26, wherein:
said measurement targets are a circumferential ring disposed around a substrate undergoing processing inside a substrate processing apparatus and an electrode plate set so as to face opposite said circumferential ring.

29. A temperature/thickness measuring method according to claim 19, further comprising:
altering the intensity of the light emitted at said light source while measuring the interference manifested by said measurement light and said reference light.

30. A temperature/thickness measuring method according to claim 29, further comprising:
gradually increasing the intensity of light emitted at said light source in correspondence to the distance traveled by said reference light reflecting means.

31. A temperature/thickness measuring method according to claim 29, further comprising:
altering the intensity of the light emitted at said light source in correspondence to each of said measurement targets.

32. A temperature/thickness measuring method according to claim 31, further comprising:
altering the intensity of the light emitted at said light source in correspondence to the intensity with which said measurement light is reflected at each of said measurement targets.

33. A temperature/thickness measuring method according to claim 31, further comprising:
increasing the intensity of the light emitted at said light source to a greater extent for a measurement target further away from the measurement light radiation position.

34. A temperature/thickness measuring system comprising:
a substrate processing apparatus that executes a specific type of processing on a substrate placed so as to face opposite an electrode plate within a processing chamber by applying high-frequency power to said electrode plate;
a temperature/thickness measuring apparatus mounted at said substrate processing apparatus; and
a control device that controls said temperature/thickness measuring apparatus, wherein:
said temperature/thickness measuring apparatus includes
a light source that emits light with a wavelength that allows the light to be transmitted through and reflected at a plurality of measurement targets, including, at least, said electrode plate and said substrate or circumferential ring disposed around said substrate,
a splitter that splits the light from said light source to measurement light and reference light,
a reference light reflecting means for reflecting said reference light from said splitter,
an optical path length altering means for altering said optical path length of said reference light reflected by said reference light reflecting means,
a reference light transmitting means for transmitting said reference light from said splitter to a reference light radiation position at which said reference light is radiated toward said reference light reflecting means,
a measurement light transmitting means for transmitting said measurement light from said splitter to a measurement light radiation position at which said measurement light is radiated toward said plurality of measurement targets so as to be transmitted through said measurement targets, and
a light receiving means for measuring interference of light manifested by individual measurement beams reflected from said measurement targets and said reference light reflected from said reference light reflecting means; and
said control device determines the temperatures or the thicknesses of said measurement targets based upon the results of the interference measurement provided by said light receiving means.

35. A control system comprising:
a substrate processing apparatus that executes a specific type of processing on a substrate placed so as to face opposite an electrode plate within a processing chamber by applying high-frequency power to said electrode plate;
a temperature/thickness measuring apparatus mounted at the substrate processing apparatus; and a control device that controls said temperature/thickness measuring apparatus, wherein:
said temperature/thickness measuring apparatus includes
a light source that emits light with a wavelength that allows the light to be transmitted through and reflected at a plurality of measurement targets, including, at least, said electrode plate and said substrate or a circumferential ring disposed around the substrate,
a splitter that splits the light from said light source to measurement light and reference light,
a reference light reflecting means for reflecting said reference light from said splitter,
an optical path length altering means for altering the optical path length of said reference light reflected by said reference light reflecting means,
a reference light transmitting means for transmitting said reference light from said splitter to a reference light radiation position at which said reference light is radiated toward said reference light reflecting means,
a measurement light transmitting means for transmitting said measurement light from said splitter to a measurement light radiation position at which said measurement light is radiated toward said plurality of measurement targets so as to be transmitted through said measurement targets, and
a light receiving means for measuring interference of light manifested by individual measurement beams reflected from said measurement targets and said reference light reflected from said reference light reflecting means; and
said control device determines the temperatures or the thicknesses of said measurement targets based upon the results of interference measurement provided by said light receiving means and executes at least either temperature control or process control for the substrate present in said processing chamber of said substrate processing apparatus.

36. A control method adopted in a control system for a substrate processing apparatus that executes a specific type of processing on a substrate set so as to face opposite an electrode plate within a processing chamber thereof by applying high-frequency power to said electrode plate, comprising:
a step in which measurement light and reference light obtained by splitting light from a light source that emits light with a wavelength allowing the light to be transmitted and reflected at a plurality of measurement targets including, at least, said electrode plate and said substrate or a circumferential ring disposed around said substrate are radiated respectively toward said plurality of measurement targets so as to be transmitted through said measurement targets and toward a reference light reflecting means;

a step in which interference of light manifested by measurement beams reflected from said measurement targets and said reference light reflected from said reference light reflecting means is measured while altering said optical path length of said reference light reflected from said reference light reflecting means by scanning said reference light reflecting means along one direction;

a step in which the temperatures or the thicknesses of said measurement targets are measured based upon the results of interference measurement; and a step in which at least either temperature control or process control is executed for said substrate in said substrate processing apparatus based upon the temperatures or the thicknesses of said measurement targets having been measured.

* * * * *